United States Patent
Heitz, Jr.

(10) Patent No.: US 7,621,709 B2
(45) Date of Patent: Nov. 24, 2009

(54) BALE HANDLING AND ACCUMULATION SYSTEM

(75) Inventor: Arthur Heitz, Jr., Nemo, SD (US)

(73) Assignee: Lifetime Enterprises, LLC, Sioux Falls, SD (US)

( * ) Notice: Subject to any disclaimer, the term of this patent is extended or adjusted under 35 U.S.C. 154(b) by 0 days.

(21) Appl. No.: 11/957,299

(22) Filed: Dec. 14, 2007

(65) Prior Publication Data

US 2008/0095597 A1  Apr. 24, 2008

Related U.S. Application Data

(63) Continuation-in-part of application No. PCT/US2006/016297, filed on Apr. 27, 2006, and a continuation-in-part of application No. PCT/US2007/001386, filed on Jan. 19, 2007, which is a continuation-in-part of application No. PCT/US2006/016297, filed on Apr. 27, 2006.

(60) Provisional application No. 60/840,375, filed on Aug. 25, 2006.

(51) Int. Cl.
    *B65G 65/34* (2006.01)
(52) U.S. Cl. ...................................... 414/111
(58) Field of Classification Search ............. 56/474, 56/480, 473.5; 414/24.5, 111
    See application file for complete search history.

(56) References Cited

U.S. PATENT DOCUMENTS

| | | | |
|---|---|---|---|
| 3,420,564 A | 1/1969 | Jensen | |
| 3,606,052 A | 9/1971 | Schurz | |
| 3,612,311 A | 10/1971 | Eidy et al. | |
| 3,779,402 A | 12/1973 | Erlenbusch et al. | |
| 3,931,899 A | 1/1976 | McAlhaney | |
| 3,944,274 A | 3/1976 | Mott et al. | |
| 3,958,823 A | 5/1976 | Erlenbusch et al. | |

(Continued)

FOREIGN PATENT DOCUMENTS

WO   07126451 A2   11/2007

(Continued)

OTHER PUBLICATIONS

The Hoelscher System, Systems for stacking, loading, feeding, or shipping square bales, Brochure, date unknown.

(Continued)

*Primary Examiner*—Thomas B Will
*Assistant Examiner*—Mai T Nguyen
(74) *Attorney, Agent, or Firm*—Santangelo Law Offices, P.C.

(57) ABSTRACT

A bale accumulation system for receiving, moving, and accumulating bales (3) on a bale support surface. The system may involve moving such bales (3) in linear path specific motions and transversely with respect to a bale accumulation surface (1). The system may further involve receiving such bales (3) onto a bale reception surface (11) and tilting such a bale reception surface (11) to deposit bales (3) onto the ground. Bales (3) may be aligned in various configurations on a bale support surface (1) perhaps without substantially restricting their movements on such a bale support surface (1) perhaps through the use of bale override alignment elements (16). The configuration of the bale support system also may minimize a total path distance through which bales (3) may be moved, perhaps decreasing the amount of time required to accumulate bales (3).

18 Claims, 21 Drawing Sheets

U.S. PATENT DOCUMENTS

| | | | |
|---|---|---|---|
| 4,003,297 A | | 1/1977 | Mott |
| 4,042,140 A | * | 8/1977 | McFarland ................ 414/24.5 |
| 4,053,064 A | | 10/1977 | Stewart |
| 4,069,926 A | | 1/1978 | Jackson et al. |
| 4,129,258 A | | 12/1978 | Mott et al. |
| 4,149,639 A | | 4/1979 | Wells et al. |
| 4,190,392 A | | 2/1980 | Butler |
| 4,258,628 A | | 3/1981 | Jankowski |
| 4,259,035 A | | 3/1981 | DeCoene et al. |
| 4,310,275 A | | 1/1982 | Hoelscher |
| 4,619,570 A | | 10/1986 | Siebenga |
| 4,637,772 A | | 1/1987 | Stumpe |
| 4,710,086 A | | 12/1987 | Naaktgeboren et al. |
| 4,710,087 A | | 12/1987 | Naaktgeboren et al. |
| 4,833,797 A | | 5/1989 | Slunecka et al. |
| 4,844,675 A | | 7/1989 | Strosser et al. |
| 4,909,698 A | | 3/1990 | Martin |
| 4,951,452 A | * | 8/1990 | Lundahl et al. ............... 56/341 |
| 4,955,774 A | | 9/1990 | Van Ecke et al. |
| 4,961,679 A | | 10/1990 | Van Ecke et al. |
| 5,024,152 A | * | 6/1991 | Girard .................... 100/188 R |
| 5,129,780 A | | 7/1992 | Stumpe |
| 5,192,177 A | | 3/1993 | Cardinal |
| 5,333,981 A | * | 8/1994 | Pronovost et al. .......... 414/24.5 |
| 5,664,923 A | | 9/1997 | Olin |
| 5,799,466 A | | 9/1998 | Underhill |
| 5,829,238 A | | 11/1998 | Branson |
| 5,842,823 A | | 12/1998 | Kohnen et al. |
| 6,053,685 A | | 4/2000 | Tomchak |
| 6,126,374 A | | 10/2000 | Carls |
| 6,164,683 A | * | 12/2000 | Kalman ..................... 280/656 |
| 6,171,047 B1 | * | 1/2001 | Vandervalk ................ 414/24.5 |
| 6,425,235 B1 | | 7/2002 | Spaniol et al. |
| 6,851,908 B2 | | 2/2005 | Bergen et al. |
| 2002/0184870 A1 | * | 12/2002 | Spaniol et al. ................ 56/474 |
| 2002/0187021 A1 | * | 12/2002 | Drost ........................ 414/111 |
| 2003/0235485 A1 | * | 12/2003 | Bergen et al. ............... 414/111 |
| 2007/0031229 A1 | * | 2/2007 | Murfitt ....................... 414/555 |

FOREIGN PATENT DOCUMENTS

WO     07133186 A2     11/2007

OTHER PUBLICATIONS

Hoelscher, Inc., Operator's Manual and Parts Book, 1000 Accumulator, Nov. 2000.
Hoelscher, Inc., www.hoelscherinc.com/printed Apr. 25, 2006.
Newholland, Bale Wagons, www.newholland.com/nh/balewag.htm.
Lifetime Enterprises, LLC, Bale Caddie, Bale Accumulator, Brochure, 2006.
U.S. Appl. No. 60/840,375, filed Aug. 25, 2006, Specification 68 pages, drawings 28 pages.

* cited by examiner

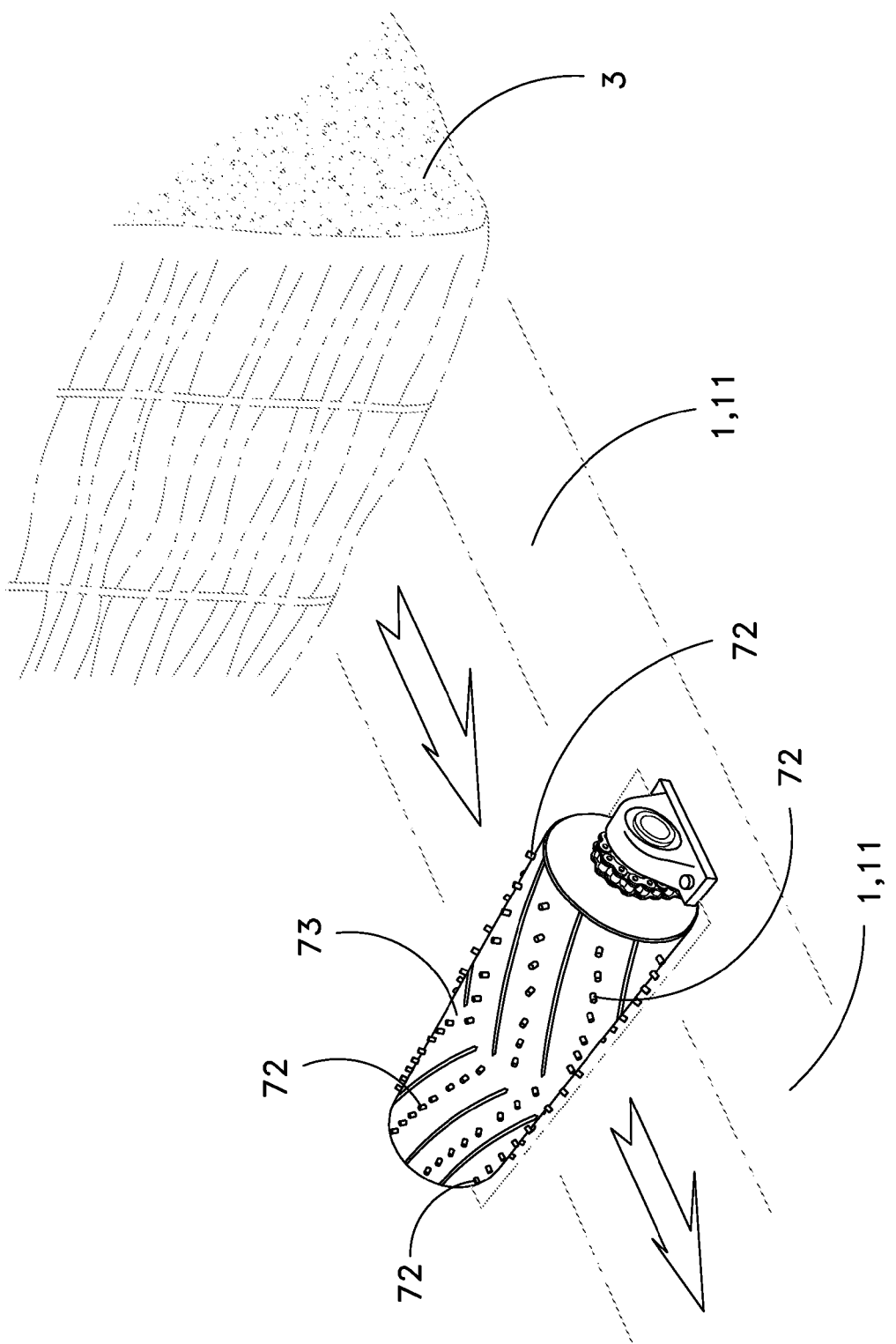

BALE HANDLING AND ACCUMULATION SYSTEM

This application is a continuation-in-part of prior International Application No. PCT/US2006/016297, filed Apr. 27, 2006, and is a continuation-in-part of prior International Application No. PCT/US2007/001386, filed Jan. 19, 2007, which is a continuation-in-part of prior International Application No. PCT/US2006/016297, filed Apr. 27, 2006, and International Application No. PCT/US2007/001386, filed Jan. 19, 2007 claims the benefit of U.S. Provisional Patent Application No. 60/840,375, filed Aug. 25, 2006, each hereby incorporated herein by reference.

TECHNICAL FIELD

The inventive technology described herein relates to the handling of bales, for example as may typically occur in agricultural settings. More specifically, methods and apparatus for collecting, moving, and accumulating bales into manageable groups may be disclosed. The inventive technology may be particularly suited to accomplishing such collecting, moving, and accumulating of bales at relatively increased process speeds and relatively decreased overall process times.

BACKGROUND

The use of bales may be an efficient and effective way to collect and store certain kinds of materials that otherwise may exist in a loosely gathered form. In agriculture, for example, bales may be a widely used method for collecting and storing grasses and other components as hay. Generally speaking, such hay bales may be formed by compressing the collected components into bundles, and then tying down or wrapping the bundles as bales to maintain the collected components in a compressed state. While such effort is sufficient to form individual bales of hay, significant additional time and labor may be required to handle the individual bales in order to put them to a productive use. For example, individual bales may be formed in a field environment directly from cut grass. This may result in numerous individual bales sporadically located throughout a field. To put these individual bales to a productive use, however, it may be required to collect them and store them at a centralized location, for example so as to provide feed for livestock. The effort required to collect such individual bales and transport them to a centralized location may entail an inefficiency in baling processes capable of improvement.

To realize such improvements, modern agricultural processes may employ various techniques to automate the collection and storage of bales. For example, automated balers may be an efficient way to form individual bales. Typically, such automated balers may be towed behind a tractor through a field. As the automated baler moves through the field, it may automate the process of compressing cut grass and wrapping the compressed cut grass as a bale. The automated baler may then serially output individual bales as the baler moves through the field. While such automation may dramatically improve the efficient formation of individual bales, the inefficiencies associated with collecting and storing such individual bales may remain.

Accordingly, modern agricultural process may further employ various kinds of bale accumulators. Typically, such bale accumulators may be towed behind the automated baler to collect individual bales output by the baler. Generally, such bale accumulators may serve to accumulate multiple bales arranged in groups, periodically depositing such grouped bales onto the ground. In this way, a baling process may result in sporadically placed groups of bales in a field rather than sporadically placed individual bales. Such placement of groups of bales may simplify the process of collecting and storing bales, as bales may be handled by group rather than one at a time.

The precise way in which individual bale accumulators arrange bales into groups prior to depositing such groups on the ground may vary greatly. Often, various automated techniques are employed to move bales about on the bale accumulator, perhaps to form groups of bales configured into rows, stacks, or the like. Further automated techniques may then be used to deposit groups on the ground, for example, by sliding, dropping, projecting, or the like.

However, the automated techniques of conventional bale accumulators may often entail a number of drawbacks. For example, the automated processes of conventional bale accumulators may frequently involve complicated procedures or multiple steps in the automated handling of bales, perhaps such as flipping, rotating, stacking, lifting, or dropping individual bales, perhaps performed on multiple platforms or multiple levels of a bale accumulator. As the number of steps in such processes increase, there may be an increased risk of failure for any given step, perhaps adversely impacting the reliability of such bale accumulators.

Moreover, such involved processes may require a bale to undergo a number of motions through a path of travel, perhaps resulting in inefficient movement of bales on such bale accumulators. Such possibly inefficient movement of bales may contribute to slowing the speed at which such bale accumulators may operate, perhaps to the point at which such bale accumulators may not be able to keep up with the output of modern balers.

Additionally, conventional bale accumulators may employ perhaps inefficient methods for maintaining bale alignment, perhaps involving aligning bales by blocking a path of travel for such bales. While creating such barriers to bale movement perhaps may serve to maintain bale alignment, such barriers also perhaps may create inefficiencies by removing more efficient paths of travel for such bales. Alternatively, some conventional bale accumulators may employ no bale alignment techniques, thus perhaps permitting a freedom of movement for such bales, but perhaps resulting in bale misalignment and correspondingly inefficient deposit of bale groups onto the ground.

The foregoing problems regarding conventional bale accumulators may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY DISCLOSURE OF THE INVENTION

The inventive technology relates to methods and apparatus for accumulating bales and may include one or more of the following features: a bale accumulation apparatus; methods for bale accumulation; techniques for minimizing the number of steps required to efficiently accumulate bales; techniques for minimizing the path distance through which bales may be moved for accumulation; techniques for increasing the rate at which bales may be accumulated; techniques for accumulating bales to match the output of modern balers; techniques for aligning bales while minimizing restrictions to their freedom of movement; techniques for efficiently utilizing a motive force to move bales on a bale accumulator; and techniques for confining a motive force to a specific linear path on a bale accumulator. Accordingly, the objects of the methods and apparatus for accumulating bales described herein address each of the foregoing in a practical manner. Naturally, further objects of the invention will become apparent from the description and drawings below.

BRIEF DESCRIPTION OF THE DRAWINGS

FIG. 22 is a perspective view of a plurality of bale catches on a baler assistance output element in one embodiment.

MODES FOR CARRYING OUT THE INVENTION

Figure 1:
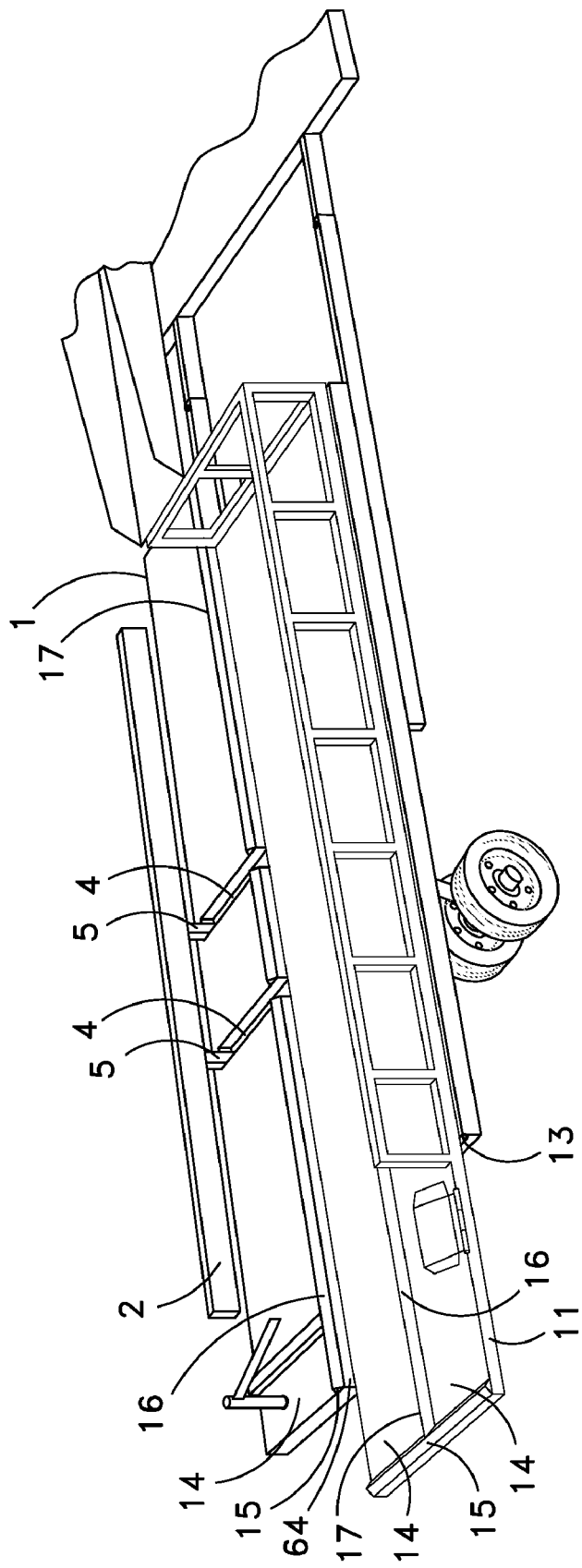
FIG. 1 is a perspective view of a bale accumulator with no bales disposed thereon in one embodiment.
Figure 2:
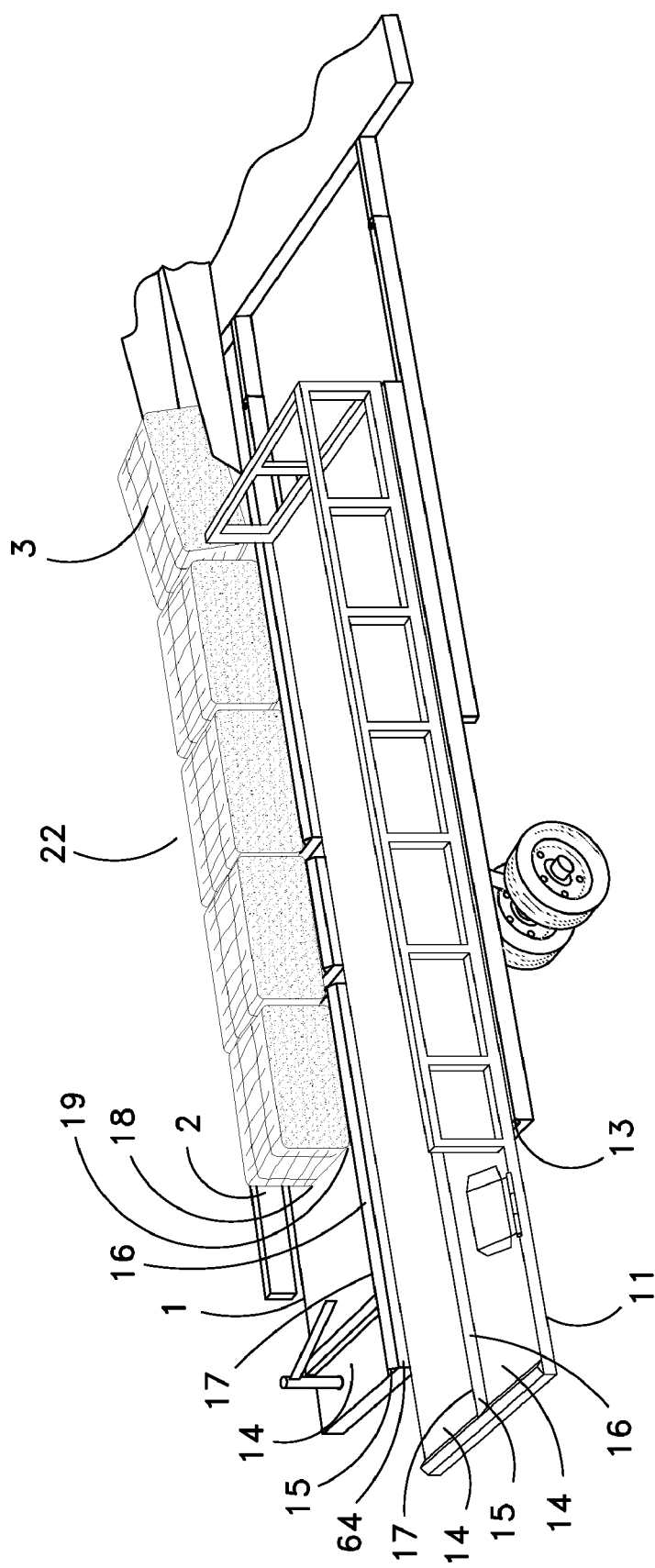
FIG. 2 is a perspective view of a bale accumulator having a first aligned multiple in-line bale row disposed thereon in one embodiment.
Figure 3:
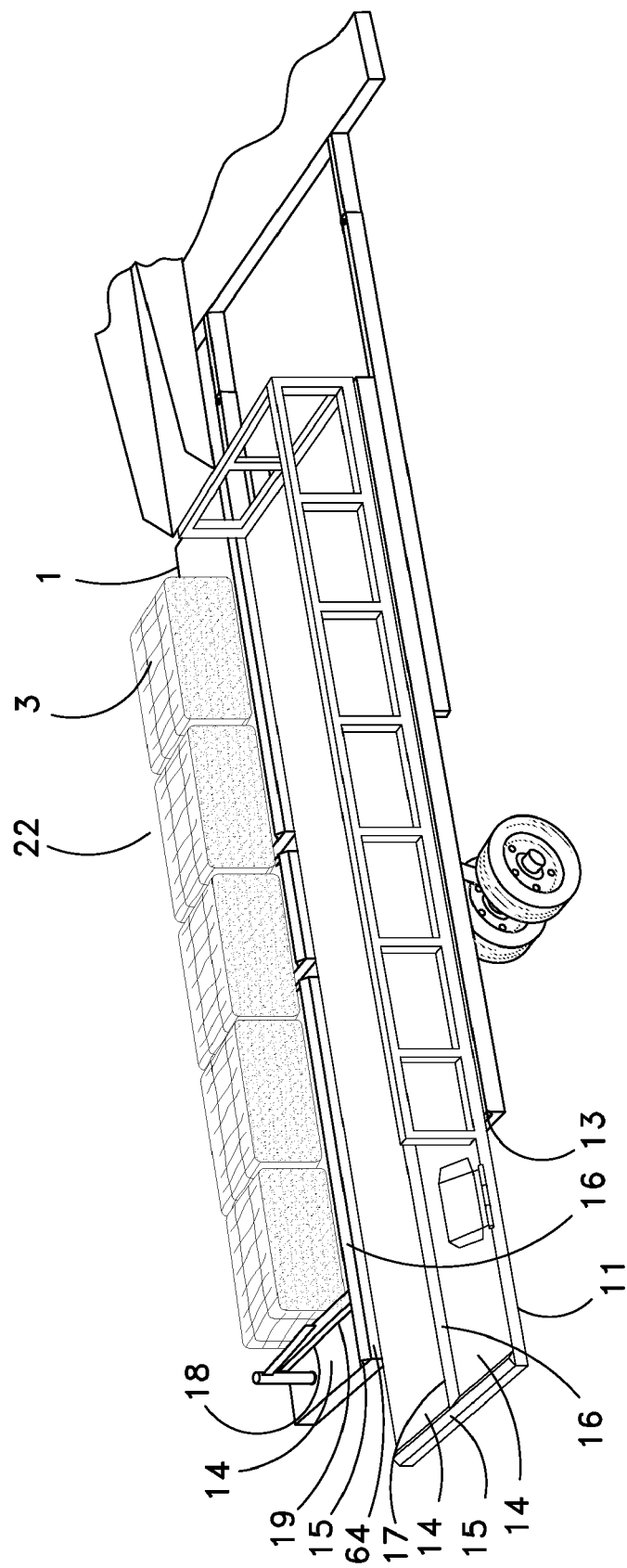
FIG. 3 is a perspective view of a bale accumulator having a pivot arm activated by a first aligned multiple in-line bale row in one embodiment.
Figure 4:
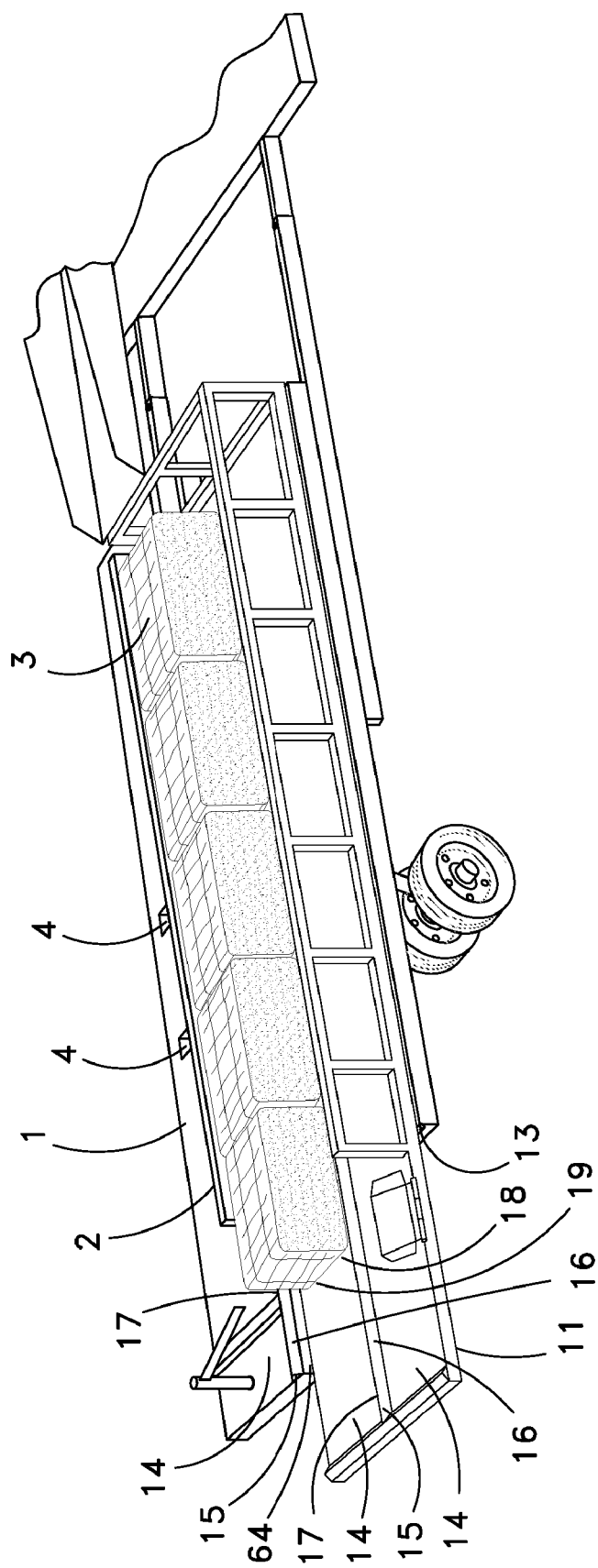
FIG. 4 is a perspective view of a bale accumulator transferring a first aligned multiple in-line bale row across a bale accumulation surface in one embodiment.
Figure 5:
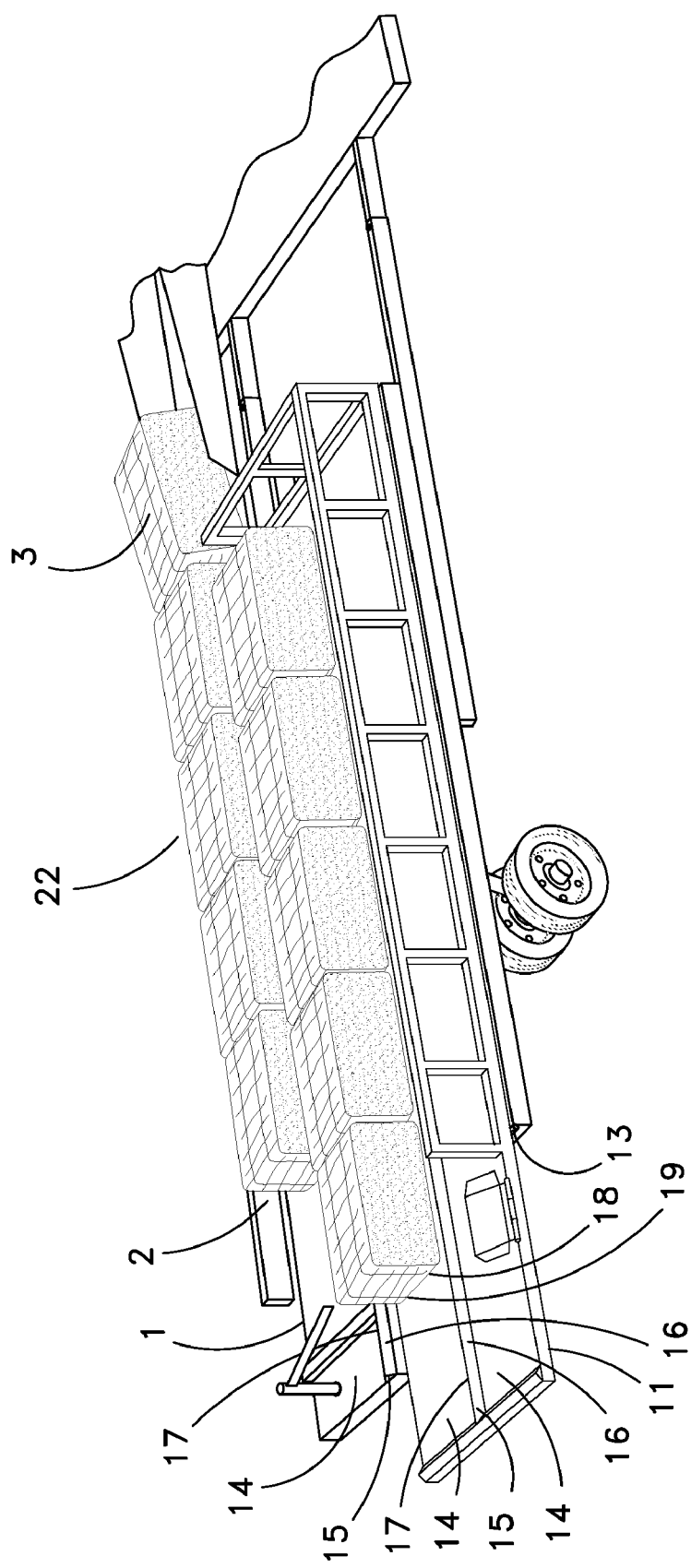
FIG. 5 is a perspective view of a bale accumulator having a second aligned multiple in-line bale row disposed thereon in one embodiment.
Figure 6:
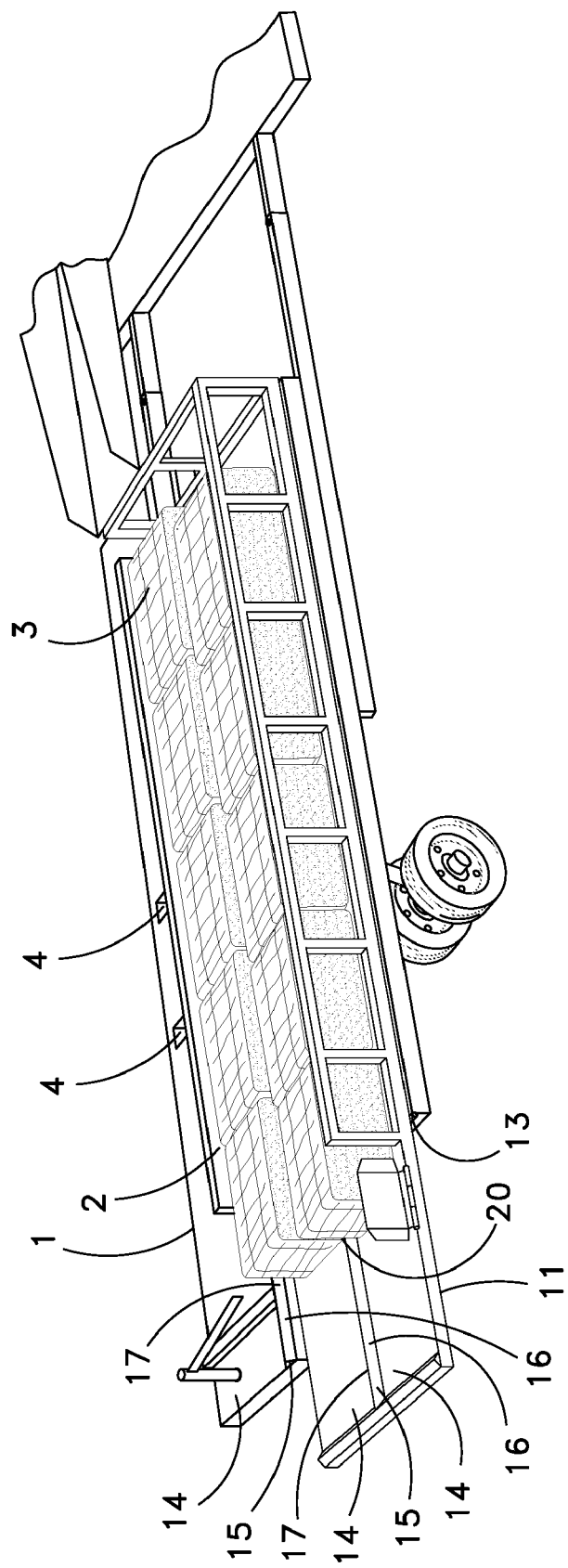
FIG. 6 is a perspective view of a bale accumulator transferring a second aligned multiple in-line bale row across a bale accumulation surface in one embodiment.
Figure 7:
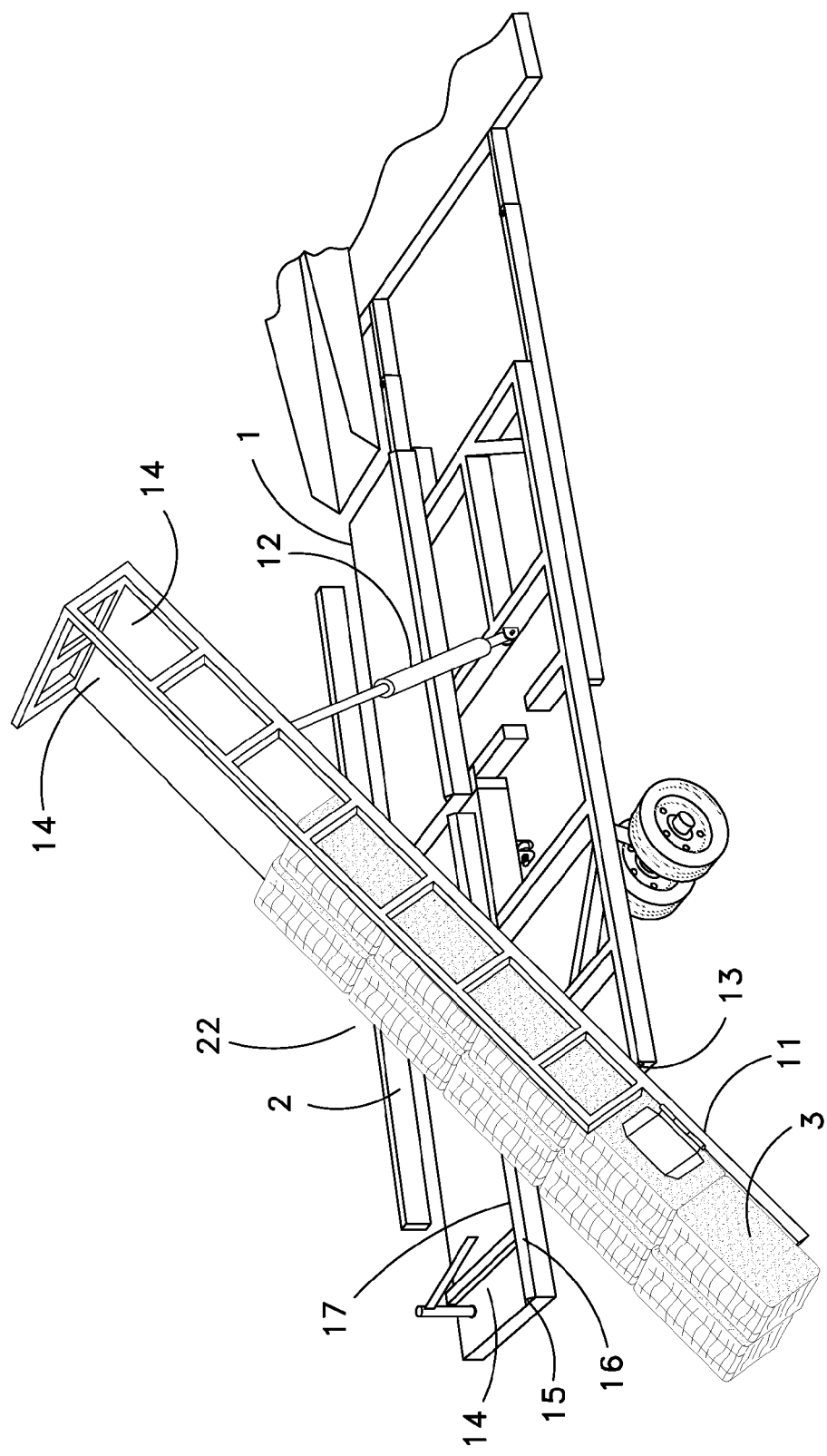
FIG. 7 is a perspective view of a bale accumulator having a tilted bale reception surface with multiple aligned in-line bale rows disposed thereon in one embodiment.
Figure 8:
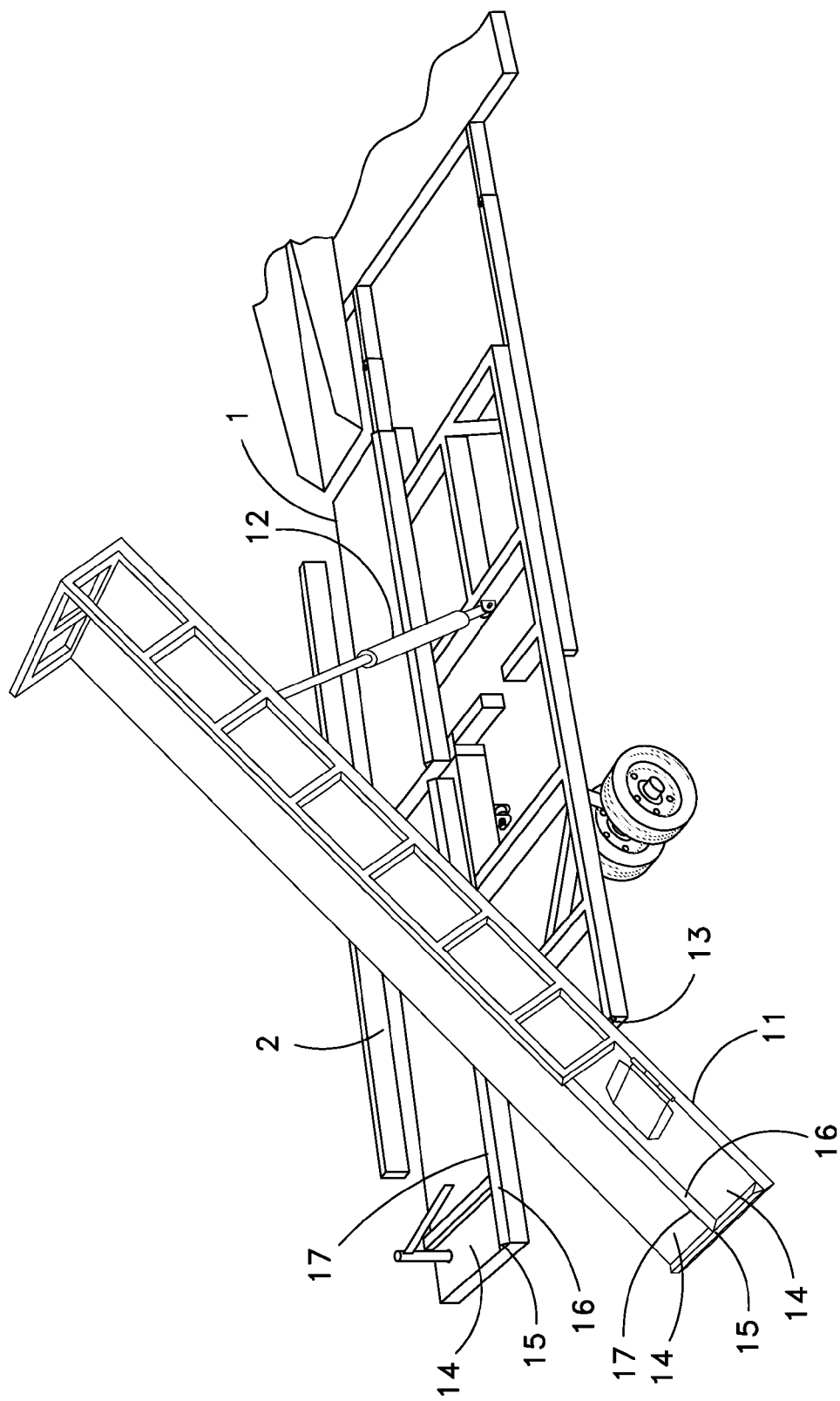
FIG. 8 is a perspective view of a bale accumulator having a tilted bale reception surface with no bales disposed thereon in one embodiment.
Figure 9A:
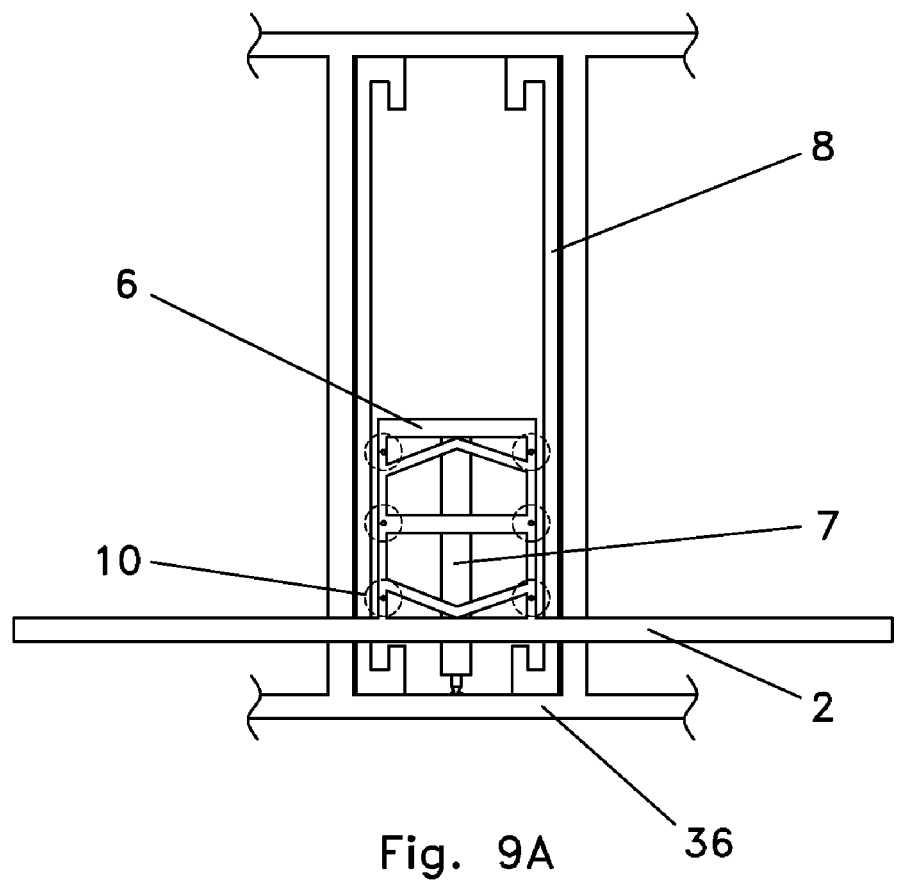
FIG. 9A is a plan view of various linear path specific elements of a bale accumulator in one embodiment.
Figure 9B:
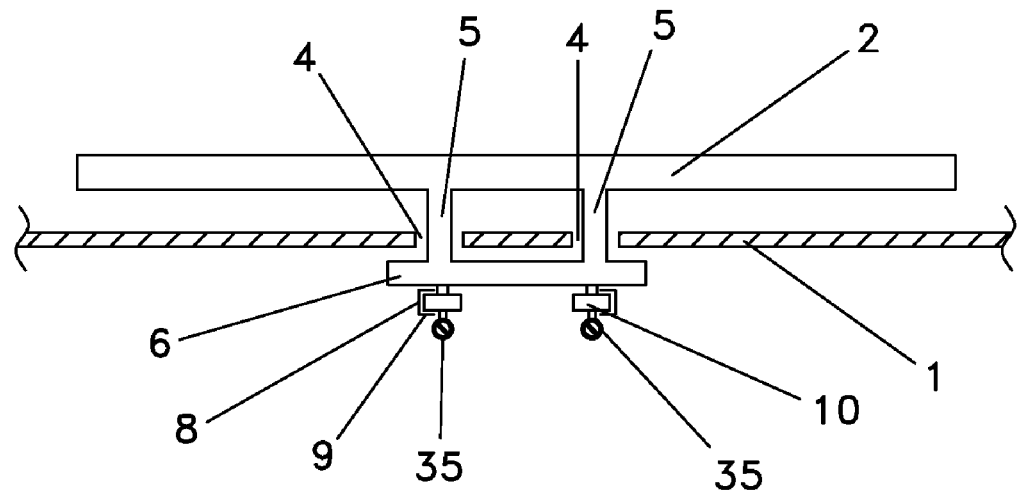
FIG. 9B is a cross section view of various linear path specific elements of a bale accumulator in one embodiment.

The present inventive technology includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Now referring primarily to FIGS. 1-9, an apparatus for accumulating bales in various embodiments may be disclosed.

As may be further discussed, various actions or items in various embodiments may include the property of being linear path specific. The term linear path specific may be understood to include actions or objects having an associated motion, wherein such associated motion is exhibited specifically over a linear path. Moreover, the term specifically may be understood to include embodiments in which such motion is exhibited exclusively over a linear path to the exclusion of other paths of motion.

As also may be further discussed, various actions or items in various embodiments may occur or be placed in various positions with respect to a bale accumulation surface (1). Placement above a bale accumulation surface (1) should be understood to include placement in merely a directionally superior location with respect to a bale accumulation surface (1), and may or may not include contact with a bale accumulation surface (1) as may be necessary or appropriate. Placement below a bale accumulation surface (1) should be understood to include placement in merely an inferior location with respect to a bale accumulation surface (1), and may or may not include contact with a bale accumulation surface (1) as may be necessary or appropriate.

As may be additionally discussed, various actions or items in various embodiments may occur or involve transverse placement with respect to a bale accumulation surface (1). By the term transversely, it should be understood that transverse placement may involve placement that is transverse to a lengthwise axis of a bale accumulation surface (1). Moreover, it may be appreciated that the term transversely may not require such a placement to be precisely transverse. Rather, as may be the case for practical applications of the inventive technology, the term transversely should be understood to include placements that are substantially transverse or even approximately transverse.

Additionally, with reference to the various types of force application elements discussed herein, it may be appreciated that such force application elements may be manually activated or automatically activated. Moreover, manual activation of a force application element need not be understood to involve manually applying the force itself, but rather of course may involve manual activation of a control that engages the actual force application element into operation. Accordingly, embodiments may include manually activating such an applied force or automatically activating such an applied force.

Embodiments may include a bale support surface. A bale support surface should be understood to include any surface capable of supporting a bale (3), and in various embodiments may include a bale accumulation surface (1), a bale reception surface (11), or other types of bale movement and storage surfaces. With attention to a bale accumulation surface (1), such a surface should be understood to include any surface capable of accumulating one or more bales (3). For example, in some embodiments a bale accumulation surface (1) may involve a baler output receivable bale accumulation surface (1), which may be understood to include bale accumulation surfaces (1) capable of receiving the output of various types of balers.

A bale transfer element may be included in some embodiments. Such a bale transfer element should be understood to include any element capable of transferring a bale (3) from one location to another location. For example, embodiments may include a unidirectional orientation neutral bale transfer element. The term unidirectional should be understood to involve bale transfer elements that move bales (3) in one direction only, for example from left to right, top to bottom, front to back, and the like. The term orientation neutral should be understood to involve bale transfer elements that do not change the orientation of a bale (3) during the process of transferring the bale (3), for example by maintaining a bale (3) flatly, maintaining a bale (3) on edge, failing to rotate a bale (3), and the like while the bale (3) is being transferred. Accordingly, a unidirectional bale transfer element may be configured to unidirectionally transfer at least one bale (3) transversely across a bale accumulation surface (1) in a neutral orientation. Of course, such unidirectional transfer may be in any suitable direction, including for example left to right, right to left, front to back, back to front, and the like.

Moreover, a unidirectional orientation neutral bale transfer element may include a bale surface contact unidirectional orientation neutral bale transfer element. By the term bale surface contact, it should be understood that a unidirectional orientation neutral bale transfer element may transfer bales (3) wherein the bales (3) maintain a contact with a bale accumulation surface (1), for example perhaps by sliding bales (3).

In various embodiments, a bale transfer element may involve a bale push bar (2). A bale push bar (2) may be understood to include a bale transfer element shaped substantially in the form of a bar having shape and dimensions sufficient to transfer a bale (3) by pushing the bale (3). It may be appreciated that such shape and dimensions of a bar may be selected as necessary for a given bale transfer need, and perhaps may particularly include a multiple in-line bale length coordinated bale push bar. Such a multiple in-line bale length coordinated bale push bar should be understood to encompass bale push bars shaped and dimensioned sufficiently to push multiple bales (3) arranged in an in-line configuration. In some embodiments, a multiple in-line bale length coordinated bale push bar may include a bale push bar made of 2 inch by 6 inch tubing and having about 10 feet in length.

Certain embodiments may involve a motive force application element to which a bale transfer element may be responsive. A motive force application element should be understood to include any element capable of applying a motive force, including for example electric motors, internal combustion engines, hydraulics, or the like. Various embodiments may include the use of a hydraulic linear path specific motive force application element (7), which may for example include hydraulic cylinders of suitable dimensions and capacities. Moreover, the term motive force should be understood to include any force capable of moving an object. Accordingly, a bale transfer element responsive to a motive force application element may be a bale transfer element moved by the application of a motive force.

A motive force application element in various embodiments may be a linear path specific motive force application element. Such a linear path specific motive force application element should be understood to involve an element capable of applying a motive force in a specific linear path. Moreover, certain embodiments may involve a linear path specific motive force application element disposed below a bale accumulation surface (1).

In various embodiments, a motive force application element may have a force application cycle and a force release cycle, which may be understood to involve applying and releasing a motive force in cycles. For example, a force application cycle may include an extension cycle, which may be understood to involve applying a motive force sufficient to extensionally displace an object through a degree of distance. Similarly, a force release cycle may include a retraction cycle, which may be understood to involve retracting such an extensionally displaced object through such degree of distance, perhaps to return it to its original position. Moreover, such a degree of distance in various embodiments may be considered to be an extension distance. It may be appreciated that such an extension distance may be selected as necessary or appropriate for a given bale accumulation function, for example including selecting a discrete bale width extension distance. A discrete bale width extension distance may be understood to include a distance equal to a discrete multiple of the width of a bale (3), and in some embodiments may be an extension distance of about one bale width. In addition, various embodiments may involve a total cycle time, which may be understood to be the time required for a motive force application element to accomplish one force application cycle followed by one force release cycle. Embodiments may include any total cycle time as may be necessary or appropriate for a given bale accumulation task, including for example perhaps less than about 6 seconds, less than about 5 seconds, less than about 4 seconds, less than about 3 seconds, less than about 2 seconds, less than about 1 second, or less than about 0.5 seconds.

Various embodiments may include a linear path specific opening (4) transversely disposed through a bale accumulation surface (1). Such an opening should be understood to include any opening through a bale accumulation surface (1) sufficient to permit motion along a linear path in the plane of such a bale accumulation surface (1).

Various embodiments may include a motive force transfer element. Such a motive force transfer element should be understood to include any element capable of transferring a motive force from one location to another. Embodiments may include a linear path specific motive force transfer element situated through a linear path specific opening (4), which may be understood to permit a linear motion of such a linear path specific motive force transfer element through such a linear path specific opening (4). In various embodiments, a motive force transfer element may be a rigid member, perhaps including a columnar rigid member (5). Such a columnar rigid member (5) perhaps may be a rigid member oriented in the manner of a column, and perhaps may be situated vertically through a linear path specific opening (4), perhaps to achieve horizontal translation through said linear path specific opening (4). Moreover, in certain embodiments, a linear path specific motive force transfer element situated through a linear path specific opening (4) may be joined to a unidirectional orientation neutral bale transfer element disposed above a bale accumulation surface (1).

Various embodiments may include a motive force carriage element. Such a motive force carriage element should be understood to include any element capable of supporting a motive force transfer element and a bale transfer element while simultaneously being moved by a motive force application element. Embodiments may include a linear path specific motive force carriage element, which should be understood to involve a motion of such a carriage element along a linear path in response to the application of a motive force. In various embodiments, a motive force carriage element may have a rigid structure, perhaps including a rectilinear rigid structure (6). Moreover, a linear path specific motive force carriage element in various embodiments may be disposed beneath a bale accumulation surface (1), and perhaps may be joined to a linear path specific motive force transfer element and a linear path specific motive force application element.

Embodiments also may involve a spring element (35) joined to such a linear path specific motive force carriage element and to a stable anchor element (36). The term spring element (35) should be understood to include any elastic material capable of expanding and rebounding in the manner of a spring. In various embodiments, such a spring element (35) may expand as a linear path specific motive force is applied to move a linear path specific motive force carriage element along a linear path. As the linear path specific motive force may be released, the spring element (35) may tend to rebound to its original state, perhaps assisting a linear path specific motive force carriage element in returning to its original location. Moreover, a stable anchor element (36) should be understood to include any element at which a spring element may be anchored, and in some embodiments may include a non-moving structural member of a bale accumulator.

Various embodiments may include a linear path specific confinement element. Such a confinement element may be understood to include any element capable of confining a motion of a linear path specific motive force carriage element to a linear path. For example, a linear path specific confinement element in some embodiments may include at least one rail (8). Such a rail (8) should be understood to include any rigid elongate structure having relatively long and narrow dimensions such as to approximate a linear path. Moreover, various embodiments may involve disposing a channel (9) on such a rail (8). Such a channel (9) should be understood to include any groove-like structure extending along a lengthwise dimension of a rail (8). Various examples of channels may include V-shaped channels, U-shaped channels, or block-shaped channels having at least one opening. In addition, embodiments may involve multiple rails, for example at least two parallel rails. In addition, such linear path specific confinement elements in various embodiments may be transversely disposed below a bale accumulation surface (1).

Embodiments may further include at least one confinement interface element. Such a confinement interface element should be understood to include any element capable of facilitating confinement of a motion of a linear path specific motive force carriage element to a linear path defined by the linear path specific confinement element. In some embodiments, such a confinement interface element may accomplish such facilitation by being disposed between a linear path specific motive force carriage element and a linear path specific confinement element. For example, various embodiments may involve a rail translatable interface element, which may be understood to include an interface element capable of being translated along at least a portion of the length of a rail (8). Such a rail translatable interface element in fact may be a channel engaged rail translatable interface element, which may be understood to include such an interface element situated within a channel (9) of a rail (8). Examples of a channel engaged rail translatable interface element may include wheels, roller bearings, ball bearings, and the like.

Various embodiments may include a bale reception surface (11). A bale reception surface (11) should be understood to include any surface capable of receiving a bale (3) transferred from another surface, for example from a bale accumulation surface (1). A bale reception surface (11) may be substantially contiguously disposed with respect to a bale accumulation surface (1). The term substantially contiguous should be understood to include fully or perhaps nearly fully in contact along an edge, but may allow for minor discontinuances in such contact, for example perhaps planar displacement along such edges or inexact overlap at the ends of such edges. Accordingly, a bale reception surface (11) may be configured to receive at least one bale (3) unidirectionally transversely transferred across a bale accumulation surface (1) in a neutral orientation.

Figure 20:
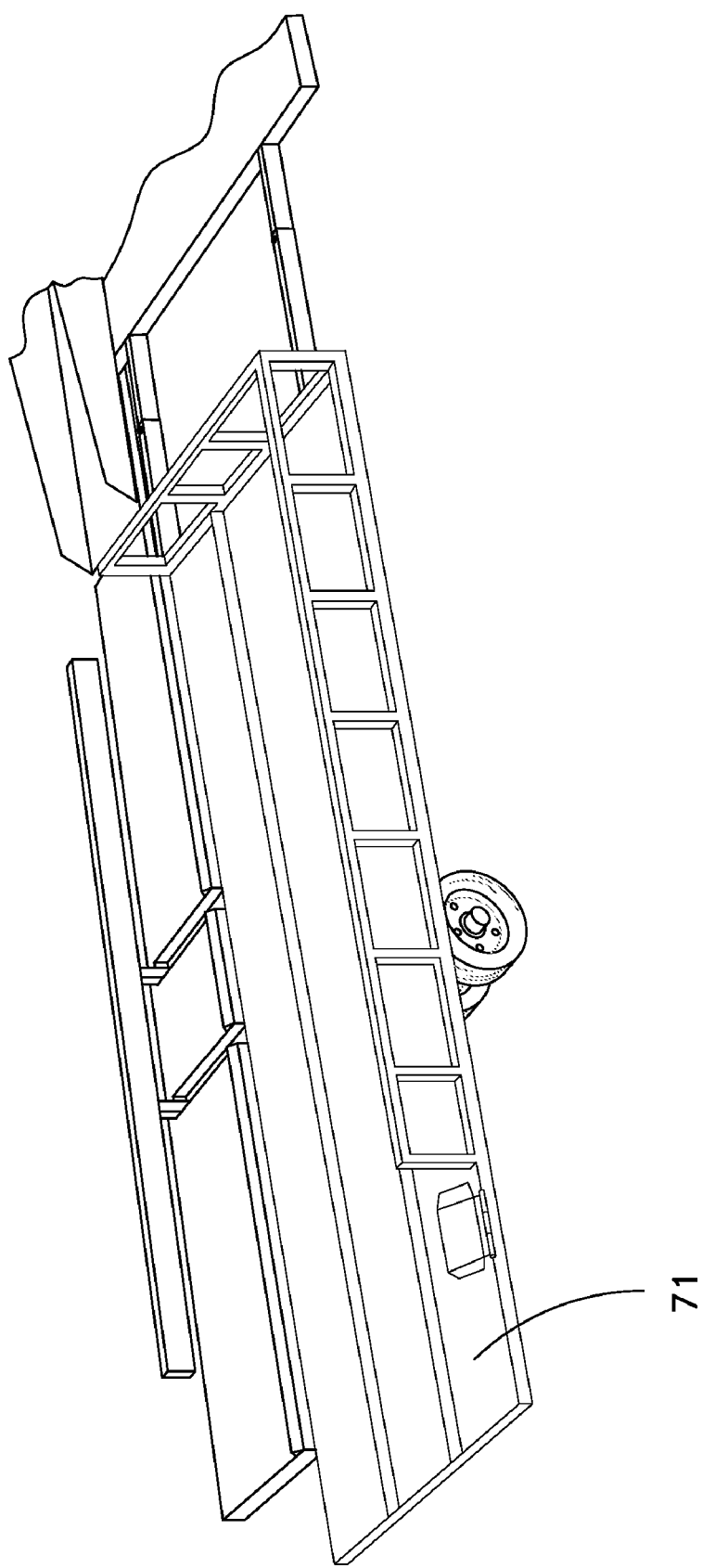
FIG. 20 is a perspective view of a bale reception surface having discrete multiple in-line bale row widths in one embodiment.

A bale reception surface (11) in various embodiments may have a width dimension. Such a width dimension may be understood to include a dimension measured perpendicularly to a lengthwise axis of a bale reception surface (11). Embodiments may include a bale reception surface (11) having a discrete multiple in-line bale row width (71). Such a width may be understood to be a width measured in discrete multiples of the width of a row of in-line bales. Accordingly, a bale reception surface (11) may be dimensioned to accommodate the width of one multiple in-line bale row (22), two multiple in-line bale rows (22), three multiple in-line bale rows, or perhaps even more multiple in-line bale rows (22), for example perhaps as may be shown in FIG. 20.

Various embodiments may include a tilt specific motive force application element (12) and a bale reception surface tilt element joined to a bale reception surface (11). A tilt specific motive force application element (12) should be understood to include any element capable of applying a force to a bale reception surface (11) enabling such a surface to undergo a tilting motion about a tilt element. Such a tilt specific motive force application element in various embodiments perhaps may include electric motors, internal combustion engines, or perhaps hydraulics, including perhaps in some embodiments a hydraulic cylinder having a 2 inch by 20 inch stroke. A tilt element should be understood to include any element capable of permitting a bale reception surface (11) to tilt, and in various embodiments may include a hinge element (13). Moreover, a tilt element in various embodiments may have an axis of rotation transversely oriented with respect to a bale accumulation surface (1). Stated differently, such a tilt element may permit a bale reception surface (11) to tilt in a direction parallel to a lengthwise axis of a bale accumulation surface (1).

In certain embodiments, a bale support surface may include at least one bale alignment zone (14). A bale alignment zone (14) may be understood to include an area of a bale support surface defining a desired configuration to which one or more bales (3) may be aligned. For example, embodiments may include a multiple in-line bale alignment zone (14), which may be understood to include zones having dimensions corresponding to the dimensions of multiple in-line bales, or perhaps even a multiple in-line bale row alignment zone, which may be understood to include zones having dimensions corresponding to multiple rows of in-line bales.

A bale alignment zone (14) in various embodiments may include at least one bale alignment boundary (15). The term bale alignment boundary (15) may be understood to include boundaries of a bale alignment zone (14) to which at least one bale (3) may be conformed for alignment. It may be appreciated that such bale alignment boundaries may take a variety of configurations. In particular, various embodiments may include a bale alignment boundary (15) having a bale dimension coordinated boundary length. Such a length may be a length selected to coordinate to a dimension of a bale (3). For example, such lengths may include lengths coordinated to at least one lateral edge (18) of multiple in-line bales, at least two opposing lateral edges (19) of multiple in-line bales, or perhaps a multiple in-line bale row interlineated lateral edge (20), which may be understood to include the interior edges of two adjacent rows of multiple in-line bales.

Various embodiments may include a support surface emplaced bale override alignment element (16) situated at a bale alignment boundary (15). Such a bale override alignment element (16) should be understood to include an alignment element capable of aligning one or more bales (3) at rest by physical contact, while permitting the same such bales (3) to override the alignment element when sufficient motive force is applied to such bales (3). The term support surface emplaced should be understood to involve emplacing such a bale override alignment element (16) directly on a bale support surface. It may be appreciated that such emplacement may be accomplished by any suitable technique, for example including mechanical fasteners, adhesives, welding, or the like. Embodiments also may include a support surface contiguous bale override alignment element (16), which may be understood to involve emplacing a bale override alignment element (16) in contiguous contact with a bale support surface for at least one lengthwise dimension of such a bale override alignment element (16).

Embodiments may further involve a bale alignment boundary dimensioned bale override alignment element, which may be understood to involve selecting dimensions of a bale override alignment element (16) to correlate with the dimensions of a bale alignment boundary (15). For example, for a linear bale alignment boundary (15), such correlation may involve selecting a linearly dimensioned bale override alignment element (16). Embodiments also may involve selecting a maximum height for a bale override alignment element (16). It may be appreciated that selecting such a maximum height may relate to the ability of a bale override alignment element (16) to align bales (3) at rest versus the amount of motive force required to allow the same such bales (3) to override the alignment element. In various embodiments, such a maximum height may be selected to be less than about 3 inches, less than about 2 inches, less than about 1 inch, or perhaps even less than about 0.5 inches. Moreover, in various embodiments, a bale override alignment element (16) may be an angle iron (21) emplaced on a bale support surface at a bale alignment boundary (15).

Certain embodiments may further include a bale override interface (17) provided on a surface emplaced bale override alignment element (16). By the term bale override interface (17), it should be understood that a bale override alignment element (16) may have a surface that contacts a surface of a bale (3) as such a bale (3) may override such an alignment element. In various embodiments, such an interface may include a rounded bale override interface or perhaps an angled bale override interface, perhaps including an angle of an angle iron (21).

Figure 10A:
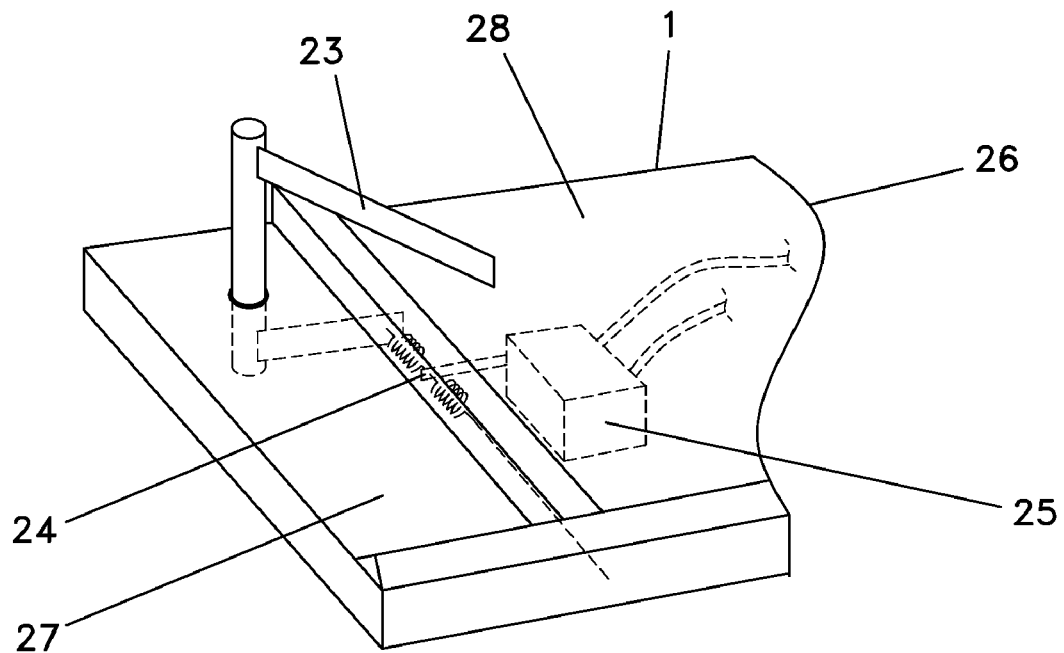
FIG. 10A is a perspective view of a pivot arm and associated elements of a bale accumulator in one embodiment.
Figure 10B:
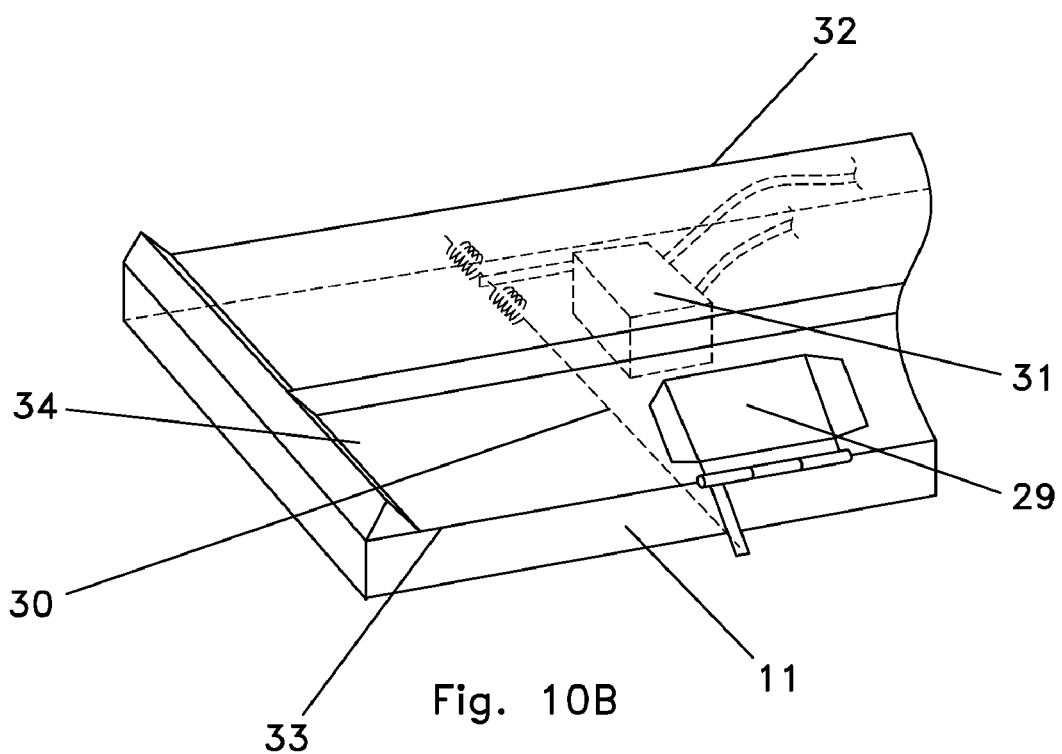
FIG. 10B is a perspective view of a push-over plate and associated elements of a bale accumulator in one embodiment.

Now referring primarily to FIG. 10, various embodiments may include a bale movement activated linear path specific motive force application element actuation sensor. Such an actuation sensor should be understood to include any sensor for actuating a linear path specific motive force application element, wherein such a sensor is activated by the movement of at least one bale (3), perhaps including by multiple bales (3). In various embodiments, such an actuation sensor may include a pivot arm (22) disposed above a bale accumulation surface (1). Such a pivot arm (22) should be understood to include any rigid, elongated member capable of being pivoted about an axis through contact with a bale (3). Embodiments may further include a pivot arm linkage element (24) disposed below a bale accumulation surface (1) joined to said pivot arm (22). Such a pivot arm linkage element (24) should be understood to include any object or assembly of objects capable of being affected by the pivot of a pivot arm (22). Embodiments may further include a linear path specific motive force application element actuator (25) disposed below said bale accumulation surface (1) joined to said pivot arm linkage element (24). Such an actuator should be understood to include any object or assembly of objects capable of actuating a linear path specific motive force application element in response to an effect generated in a pivot arm linkage element (24) by the pivot of a pivot arm (22).

Various embodiments may include a bale input end (26) of a bale accumulation surface (1) and a bale sensor end (27) of a bale accumulation surface (1). A bale input end (26) may be understood to include an end of a bale accumulation surface (1) at which bales (3) may be placed onto such a bale accumulation surface (1), and a bale sensor end (27) may be understood to include an end of a bale accumulation surface (1) at which an actuation sensor may be placed. Moreover, such a bale input end (26) and a bale sensor end (27) may be separated by a surface area of such a bale accumulation surface (1). Such a surface area may be any appropriate length for a bale accumulation task, and may for example include a discrete multiple in-line bale length area (28) of a bale accumulation surface (1). Embodiments may further involve establishing a pivot arm (22) at a bale sensor end (27) of such a bale accumulation surface (1).

Embodiments also may include a bale movement activated tilt specific motive force application element actuation sensor. Such an actuation sensor should be understood to include any sensor for actuating a tilt specific motive force application element (12), wherein such a sensor is activated by the movement of at least one bale (3), perhaps including by multiple bales (3). In various embodiments, such an actuation sensor may include a push-over plate disposed above a bale reception surface (11). Such a push-over plate (29) should be understood to include any rigid plate capable of being pushed over an axis through contact with a bale (3). Embodiments may further include a push-over plate linkage element (30) disposed below a bale reception surface (11) joined to said push-over plate (29). Such a push-over plate linkage element (30) should be understood to include any object or assembly of objects capable of being affected by the push-over action of a push-over plate (29). Embodiments may further include a tilt specific motive force application element actuator (31) disposed below said bale accumulation surface (1) joined to said push-over plate linkage element (30). Such an actuator should be understood to include any object or assembly of objects capable of actuating a tilt specific motive force application element (12) in response to an effect generated in a push-over plate linkage element (30) by the push-over action of a push-over plate (29).

Various embodiments also may include a bale input side (32) of a bale reception surface (11) and a bale sensor side (33) of a bale reception surface (11). A bale input side (32) may be understood to include a side of a bale reception surface (11) at which bales (3) may be received onto such a bale reception surface (11), for example perhaps in being transferred from a bale accumulation surface (1). A bale sensor side (33) may be understood to include a side of a bale reception surface (11) at which an actuation sensor may be placed. Moreover, such a bale input side (32) and a bale sensor side (33) may be separated by a surface area of such a bale reception surface (11). Such a surface area may be of any appropriate width for a bale reception task, and may for example include a discrete multiple in-line bale row width area (34) of a bale reception surface (11). Embodiments may further involve establishing a push-over plate (29) at a bale sensor side (33) of such a bale reception surface (11).

Now referring again primarily to FIGS. 1-9, a bale accumulation method in various embodiments may be disclosed.

Various embodiments may involve depositing at least one bale (3) on a bale support surface and applying a motive force to move such a bale (3). Such a bale support surface in various embodiments may include a bale accumulation surface (1), and applying such a motive force may include applying a linear path specific motive force. Embodiments may further include applying such a motive force to a bale transfer element and moving such a bale (3) with such a bale transfer element. Moreover, embodiments may involve moving multiple bales (3), including perhaps multiple in-line bales, or perhaps even multiple in-line bale rows (22).

Applying a linear path specific motive force in some embodiments may include cyclically applying and cyclically releasing such a motive force, perhaps even involving steps of cyclically extending and cyclically retracting. Cyclically extending in certain embodiments may involve extending for a discrete bale width distance, perhaps including extending for a distance of about one bale width. Moreover, embodiments may involve accomplishing a total cycle time of less than about 6 seconds, less than about 5 seconds, less than about 4 seconds, less than about 3 seconds, less than about 2 seconds, less than about 1 second, or perhaps even less than about 0.5 seconds. In addition, applying a linear path specific motive force may involve hydraulically applying a linear path specific motive force, perhaps with a hydraulic linear path specific motive force application element (7), which may for example include hydraulic cylinders of suitable dimensions and capacity, and in some embodiments perhaps a 2 inch by 24 inch stroke hydraulic cylinder.

In certain embodiments, applying a linear path specific motive force may include doing so beneath a bale accumulation surface (1) and may further involve delivering such force to a unidirectional orientation neutral bale transfer element disposed above such a bale accumulation surface (1). Such a force may be delivered perhaps by moving a linear path specific motive force carriage element located beneath said bale accumulation surface (1) as a result of said applied linear path specific motive force, establishing a linear path specific opening (4) transversely disposed through said bale accumulation surface (1), transferring said linear path specific motive force applied below said bale accumulation surface (1) through such a linear path specific opening (4) via a linear path specific motive force transfer element situated through said linear path specific opening (4) and joined to said linear path specific motive force carriage element, and joining said linear path specific motive force transfer element to a unidirectional orientation neutral bale transfer element disposed above said bale accumulation surface (1).

Embodiments also may involve elastically retrieving a motive force carriage element, for example perhaps with a spring element (35). The term elastically retrieving should be understood to include progressively resisting a linear path specific motive force applied to a motive force carriage element, followed by regressively applying a return force tending to return such a motive force carriage element to its original position.

Embodiments also may include moving a bale (3) in a specific linear path. Such specific linear path movement perhaps may be accomplished by specifically confining a motion of a linear path specific motive force carriage element to a linear path located below a bale accumulation surface (1) and transversely oriented to said bale accumulation surface (1). Such confinement may be applied to a linear path specific motive force carriage element perhaps by providing a confinement interface along such a linear path located below said bale accumulation surface (1) and transversely oriented to said bale accumulation surface (1). It also may be appreciated that confining a linear path specific motive force carriage element in this manner may consequently confine a linear path specific motive force transfer element joined to said carriage element and a unidirectional orientation neutral bale transfer element joined to said motive force transfer element, thereby resulting in moving a bale (3) along a specific linear path.

Specifically confining a motion of a linear path specific motive force carriage element in some embodiments may include using a rail (8) to specifically confine such motion, perhaps even using a channel (9) disposed on such a rail (8). Embodiments also may include using multiple such rails, perhaps including using at least two parallel such rails. Moreover, providing a confinement interface in certain embodiments may include translating an interface element along such a rail (8), perhaps including engaging such an interface element to a channel (9) disposed on such a rail (8), or perhaps even including situating a bearing (10) within such a channel (9). By disposing a confinement interface element between a linear path specific motive force carriage element and a linear path specific confinement element, it may be appreciated that the motion of a linear path specific motive force carriage element may be confined to a linear path defined by such a linear path specific confinement element.

In various embodiments, moving a bale (3) on a bale accumulation surface (1) may include receiving a bale (3) on such a bale accumulation surface (1) output from a baler and unidirectionally moving such a bale (3) transversely across a bale accumulation surface (1) in a neutral orientation using a unidirectional orientation neutral bale transfer element. Moving such a bale (3) may be over any distance as may be necessary or desirable, including perhaps moving such a bale (3) for a discrete bale width distance, perhaps even for a discrete bale width distance of about one bale width. Moreover, bales (3) may be moved over such a distance in a period of time of perhaps less than about 6 seconds, less than about 5 seconds, less than about 4 seconds, less than about 3 seconds, less than about 2 seconds, less than about 1 second, or perhaps even less than about 0.5 seconds.

Embodiments also may include substantially contiguously disposing a bale reception surface (11) proximate to a bale accumulation surface (1). Certain embodiments may involve dimensioning such a bale reception surface (11) to a discrete multiple in-line bale row width. Embodiments also may involve applying a tilt specific motive force to such a bale reception surface (11) and tilting such a bale reception surface (11) about a tilt element, perhaps even including tiling such a bale reception surface (11) about a hinge element (13). Moreover, such tilting of a bale reception surface (11) may include tilting about an axis of rotation transversely oriented with respect to a bale accumulation surface (1). Various embodiments also may include receiving one or more bales (3) on a bale reception surface (11), and depositing onto the ground such bales (3) received on a bale reception surface (11) through such action of tilting a bale reception surface (11).

Various embodiments may also involve aligning bales (3) on various bale support surfaces. Some embodiments may include positioning at least one bale (3) deposited on a bale support surface within a bale alignment zone (14) of such a bale support surface, establishing a bale alignment boundary (15) of such a bale alignment zone (14), emplacing a bale override alignment element (16) at a bale support surface location of such a bale alignment boundary (15), providing a bale override interface (17) of such a bale override alignment element (16), incurring contact between such a bale (3) and such a bale override alignment interface, and aligning such a bale (3) within such a bale alignment zone (14) as a result of incurring such contact. Additionally, positioning at least one bale (3) in various embodiments may include positioning multiple in-line bales, or perhaps even multiple in-line bale rows (22).

Establishing a bale alignment boundary (15) in some embodiments may include establishing a bale dimension coordinated boundary length. Examples of establishing such a bale dimension coordinated boundary length in various embodiments may include coordinating such a length to at least one lateral edge (18) of multiple in-line bales, coordinating such a length to at least two opposing lateral edges (19) of multiple in-line bales, or perhaps even coordinating such a length to a multiple in-line bale row interlineated lateral edge (20).

Emplacing a bale override alignment element (16) in certain embodiments may involve substantially contiguously emplacing a bale override alignment element (16) at a bale support surface location of a bale alignment boundary (15). Moreover, embodiments may involve selecting dimensions of a bale override alignment element (16) to coordinate with a bale alignment boundary (15), perhaps including selecting a maximum height of such a bale override alignment element (16) of less than about 3 inches, less than about 2 inches, less than about 1 inch, or perhaps even less than about 0.5 inches. Additionally, providing a bale override interface (17) may include providing a rounded bale override interface, providing an angled bale override interface, or perhaps even providing an angle on an angle iron (21). Various embodiments also may include contacting a bale (3) to a bale override alignment interface while such a bale (3) is being moved over a bale support surface. Such contacting may involve, for example, lateral contact along a side of a bale override alignment interface, or perhaps even overriding a bale override alignment interface. Moreover, contacting a bale (3) may involve contacting multiple bales (3), perhaps including multiple in-line bales (3) or possibly even multiple in-line bale rows (22).

Now referring again primarily to FIG. 10, embodiments also may include actuating various motive forces through various bale movements. For example, some embodiments may include activating a linear path specific motive force application element actuation sensor with at least one bale (3), or perhaps multiple bales (3). While it may be appreciated that various configurations may be available to achieve such actuation, some embodiments may involve displacing a pivot arm (22) located above a bale accumulation surface (1) with at least one bale (3), affecting a pivot arm linkage element (24) disposed below such a bale accumulation surface (1) as a result of displacing such a pivot arm (22), and actuating a linear path specific motive force application element actuator (25) disposed below such a bale accumulation surface (1) as a result of affecting such a pivot arm linkage element (24).

Moreover, embodiments may involve establishing a bale input end (26) of a bale accumulation surface (1), establishing a bale sensor end (27) of a bale accumulation surface (1), and separating such bale input end (26) and such bale sensor end (27) with a discrete multiple in-line bale length area (28) of a bale accumulation surface (1). Some embodiments may include receiving bales (3) onto such a bale accumulation surface (1) at such a bale input end (26) and situating a pivot arm (22) at such a bale sensor end (27).

Additionally, some embodiments may include activating a tilt specific motive force application element actuation sensor with at least one bale (3), or perhaps multiple bales (3). While it may be appreciated that various configurations may be available to achieve such actuation, some embodiments may involve displacing a push-over plate (29) located above a bale reception surface (11) with at least one bale (3), affecting a push-over plate linkage element (30) disposed below such a bale reception surface (11) as a result of displacing such a push-over plate (29), and actuating a tilt specific motive force application element actuator (31) disposed below such a bale reception surface (11) as a result of affecting such a push-over plate linkage element (30).

Moreover, embodiments may involve establishing a bale input side (32) of a bale reception surface (11), establishing a bale sensor side (33) of a bale reception surface (11), and separating such bale input side (32) and such bale sensor side (33) with a discrete multiple in-line bale row width area (34) of a bale reception surface (11). Some embodiments may include receiving bales (3) onto such a bale reception surface (11) at such a bale input side (32) and situating a push-over sensor at such a bale sensor side (33).

Figure 11:
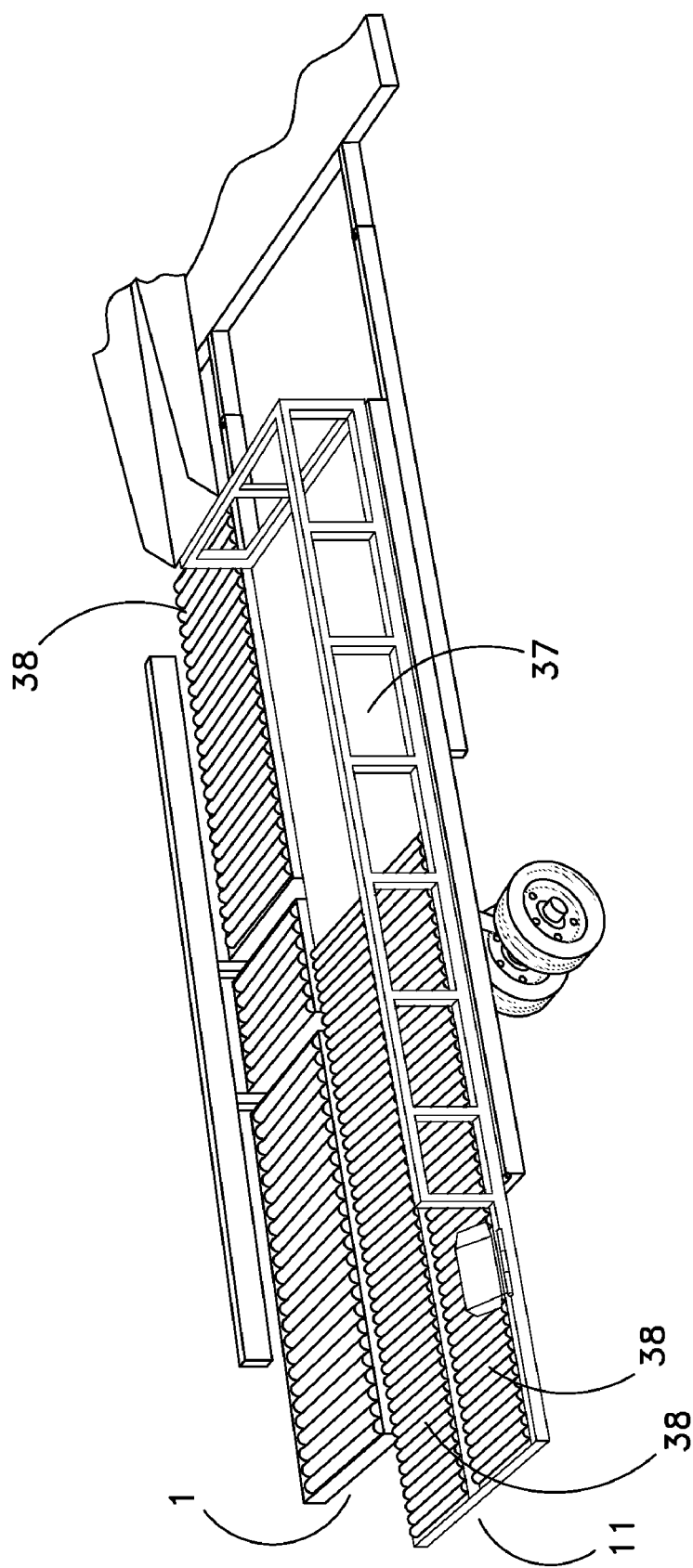
FIG. 11 is a perspective view of a plurality of rollers on a bale accumulation surface and a non-inclined bale reception surface in one embodiment.
Figure 12:
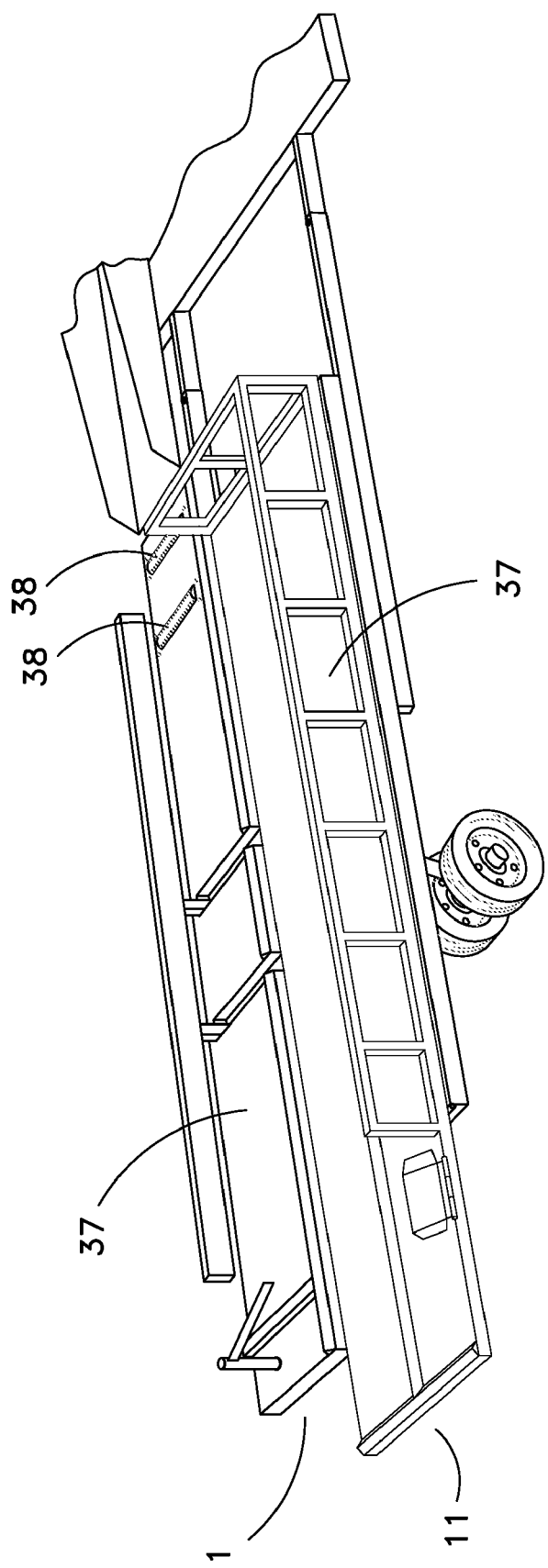
FIG. 12 is a perspective view of two spaced-apart rollers on a bale accumulation surface configured as a baler output assistance element in one embodiment.

Now referring primarily to FIGS. 11-12, either or both of a bale accumulation surface (1) and a bale reception surface (11) in various embodiments may include a movement facilitation element. A movement facilitation element should be understood to include an element capable of facilitating sliding motion of objects, such as bales (3), across a bale accumulation surface (1) or a bale reception surface (11). In some embodiments, a movement facilitation element may be a low friction surface (37). The term low friction should be understood to include a property of the surface that tends to minimize the friction associated with sliding contact of an object, such as a bale (3), with the surface, perhaps even to result in a lower friction as compared to typical materials not having low friction properties as a goal. In this manner, a low friction surface (37) may tend to facilitate movement of a bale (3) across the surface by making it easier to slide. It may be appreciated that a number of techniques may be appropriate to create a low friction surface (37) depending on specific applications and desired goals, including perhaps coating the surface, covering the surface, painting the surface, spraying the surface, or fastening additional materials, such as overlays, to the surface.

A movement facilitation element in various embodiments also may include a movable part. A movable part should be understood include a part, some or all of which is capable of undergoing some degree of motion. In various embodiments, such a movable part may facilitate the sliding motion of an object, such as a bale (3), across a bale accumulation surface (1) or a bale reception surface (11) by moving with the object. For example, a movable part in various embodiments may include a roller (38), an axially rotational shaft (54) with a bale movement blade (53) attached thereto, a chain, a belt, or the like. In certain embodiments, a movable part may be freely movable, which may be understood to include undergoing motion in response to an external force. One example of a freely movable part may include a part at rest until an object, such as a bale (3), overrides it, at which point the part may move in response to being overridden. In other embodiments, a movable part may be driven, which may be understood to include having motion induced in the movable part, for example perhaps by a motor. One example of a driven movable part may include a movable part in motion that tends to move objects coming into contact with it, such as a bale (3) placed in contact with the moving part. In certain embodiments, a driven movable part may be driven to a speed faster than the output of a baler, for example, perhaps a roller (38) spinning faster than the rate at which bales are output from a baler. This perhaps may serve to provide a discrete push to bales moving on a bale accumulation surface.

Embodiments may include a baler output assistance element. A baler output assistance element may be understood to include one or more moving parts configured to assist the transfer of bales (3) from a baler to a bale accumulation surface (1). For example, embodiments may include a partially-ejected bale assistance element, which may assist the motion of a partially-ejected bale (3) across a bale accumulation surface (1), and a completely-ejected bale assistance element, which may assist the motion of a completely-ejected bale (3) across a bale accumulation surface (1). In this manner, a baler output assistance element may aid in moving bales (3) from a baler to a bale accumulation surface (1). In some embodiments, a baler output assistance element may include two spaced-apart rollers (38) located on a bale accumulation surface (1) near the output chute of a baler.

A moving part in various embodiments may include a bale catch (72), as shown perhaps in one embodiment in FIG. 22. Bale catches (72) may include components of moving parts which may catch on a bale (3) as the bale (3) comes into contact with the moving part. Examples of bale catches (72) may include studs, ridges, nonskid surfaces, or other components tending to grip or hold a bale (3) in contact with a moving part. For example, a bale catch (72) in certain embodiments may be a studded roller (73). Bale catches (72) may be useful in some embodiments to impart the motion of a moving part to a bale (3) coming into contact with the moving part by catching the bale on the part in motion. In this manner, bales (3) may be propelled or arrested by the moving parts, thereby facilitating movement of the bales on a bale accumulation surface (1) or a bale reception surface (11). For example, embodiments may involve catching bales (3) on driven moving parts, such as a driven studded roller (73), to propel the bale (3) along a surface. In this manner, for example, a baler output assistance element may use a bale catch (72) to catch on bales (3) being ejected from the baler, thereby assisting movement of the ejected bales (3) from the baler to a bale accumulation surface (1) by propelling the bales (3) away from the baler's output.

Embodiments also may include an incline motion assistance element. An incline motion assistance element may be understood to include one or more moving parts configured to assist motion of bales (3) across an inclined surface, for example perhaps the tilted orientation of a bale reception surface (11). In this manner, an incline motion assistance element may aid in sliding accumulated bales (3) off of a tilted bale reception surface (11) and onto the ground. In some embodiments, an incline motion assistance element may include a plurality of rollers (38) on a bale reception surface (11).

Various embodiments may use rollers (38) in various configurations to facilitate the movement of bales across a bale accumulation surface (1) or a bale reception surface (11). For example, embodiments may include a plurality of substantially contiguously disposed rollers (38). Rollers (38) arranged in such a fashion may act in concert to provide effectively a single moving surface upon which one or more bales may be moved. Moreover, the size, shape or other configuration of such a moving surface made up of substantially contiguously disposed rollers (38) used in this manner may be varied to any desired arrangement on a bale accumulation surface (1) or bale reception surface (11). For example, such rollers may occupy a substantially contiguous portion of a bale accumulation surface (1) or a bale reception surface (11), including perhaps merely some percentage of the overall surface less than the total surface itself, or perhaps even substantially all of the surface itself. Additionally, the orientation of the rollers may be placed as desired, for example perhaps to facilitate transverse or longitudinal bale movement on the surfaces. Of course, these are merely examples of how rollers (38) may be arranged, and it may be appreciated that such rollers may be arranged in any suitable configuration consistent with the discussion set forth herein. Accordingly, embodiments may include moving a plurality of substantially contiguously disposed rollers (38) consistent with the principles described herein.

Moreover, it may be appreciated that a plurality of moving parts may be placed at any suitable locations on a bale accumulation surface (1) or bale reception surface (11) to facilitate movement of bales (3) across the surface in various embodiments.

Accordingly, embodiments may include facilitating a movement of a bale (3) on either or both of a bale accumulation surface (1) and a bale reception surface (11). In some embodiments, such facilitating may include reducing friction, perhaps by coating, covering, painting, spraying, or fastening. In other embodiments, such facilitating may include moving a part, perhaps including permitting a free rotation of the part or perhaps including driving a motion of the part. Various embodiments may include moving a roller (38), moving a chain, or moving a belt. Moreover, embodiments may involve moving a plurality of parts, including perhaps in some embodiments moving at least two spaced apart rollers (38) or in other embodiments a plurality of rollers (38) on a bale reception surface (11). Further, embodiments may include assisting a baler output, including in some embodiments perhaps assisting motion of a partially-ejected bale or in other embodiments perhaps assisting motion of a completely-ejected bale, and perhaps in certain embodiments even facilitating movement on an incline.

Figure 13:
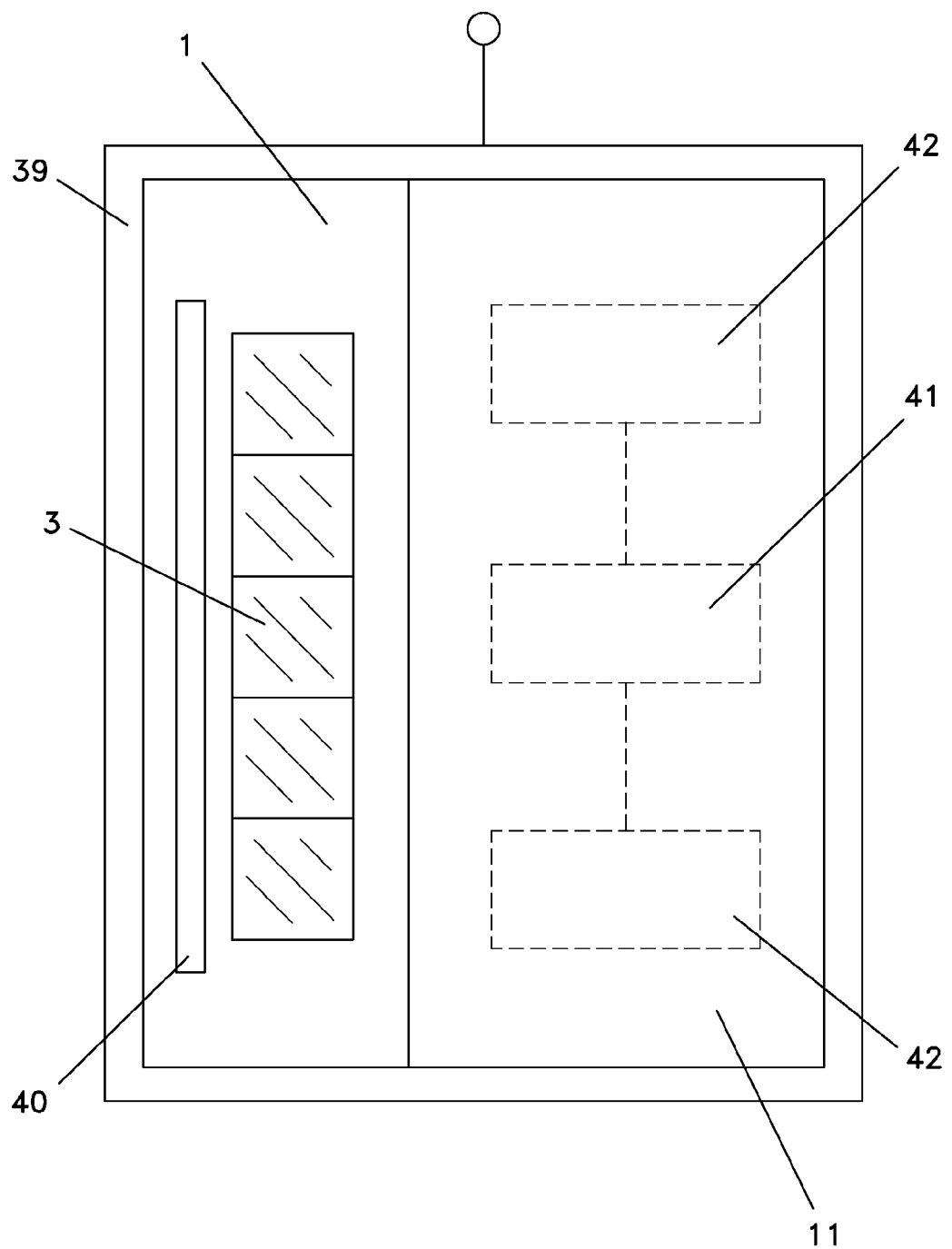
FIG. 13 is a schematic representation of a self-contained power source and associated elements of a bale accumulator in one embodiment.

Now referring primarily to FIG. 13, a bale accumulation apparatus in various embodiments may include a support structure (39), a bale accumulation surface (1) joined to the support structure (39), a bale transfer element (40) configured to transfer at least one bale (3) across the bale accumulation surface (1) joined to the support structure (39), and a self-contained power source (41) joined to the support structure (39). A support structure (39) should be understood to include any arrangement of elements capable of providing support to the various components of a bale accumulation apparatus, perhaps so as to configure the bale accumulation apparatus to perform its functions as an integrated whole. For example, embodiments may include a towed mobile support structure, which may permit a bale accumulation apparatus to be towed by a mobile machine, such as a tractor.

A self-contained power source (41) should be understood to include a power source capable of generating power without resort to devices not substantially integrated with the support structure (39) of a bale accumulation apparatus. Stated differently, a self-contained power source (41) should be understood to include power sources which are substantially integrated with the structure of a bale accumulation apparatus. Examples of a self-contained power source (41) may include, for example, generators mounted onto a bale accumulation apparatus. Examples of a non-self-contained power source may include, for example, power derived from a tractor or other mobile machine that tows a bale accumulation apparatus.

A self-contained power source (41) in various embodiments may be understood to be configured to power various elements of a bale accumulation apparatus as may be necessary or desirable, including for example the motion of a bale transfer element (40) or the tilt motion of a bale reception surface (11). Moreover, it may be appreciated that any suitable power source may be used depending on the requirements of a given application, for example such as internal combustion engines or electric motors.

Additionally, embodiments may include a force application element (42), which may be understood to include an element configured to apply power generated by a self-contained power source (41) to a powered element of a bale accumulation apparatus, for example a bale transfer element (40) or the tilting of a bale reception surface (11). It may be appreciated that any number of suitable force application elements (42) may be used depending on particular needs, for example including hydraulics. Accordingly, embodiments may include hydraulic force application elements (42) to apply power generated by a self-contained power source (41), for example to power the motion of a bale transfer element (40) or the tilt motion of a bale reception surface (11).

Accordingly, embodiments may include structurally supporting a bale accumulation surface (1) and a power source, depositing at least one bale (3) on the bale accumulation surface (1), moving the bale (3) across the bale accumulation surface (1), powering the movement of the bale (3) with the power source, and accomplishing the step of powering the movement in a self-contained manner relative to the action of structurally supporting the bale accumulation surface (1) and the power source. By the terms accomplishing in a self-contained manner relative to the action of structurally supporting, it may be understood that power may be provided integrally in connection with the action of structurally supporting. Stated differently, power need not be obtained from a source external to that which is being structurally supported. Embodiments may further include generating power at the power source and applying power from the power source to the bale (3), perhaps including hydraulically. In addition, embodiments may include structurally supporting a bale reception surface (11), receiving a bale (3) moved across the bale accumulation surface (1) on the bale reception surface (11), titling the bale reception surface (11), powering such tilting of the bale reception surface (11) with the power source, and accomplishing the step of powering the tilting in a self-contained manner relative to structurally supporting the bale reception surface. Embodiments may further include applying power from the power source to tilt the bale reception surface (11), perhaps even hydraulically. In certain embodiments, structurally supporting may include movably towably structurally supporting.

Figure 14:
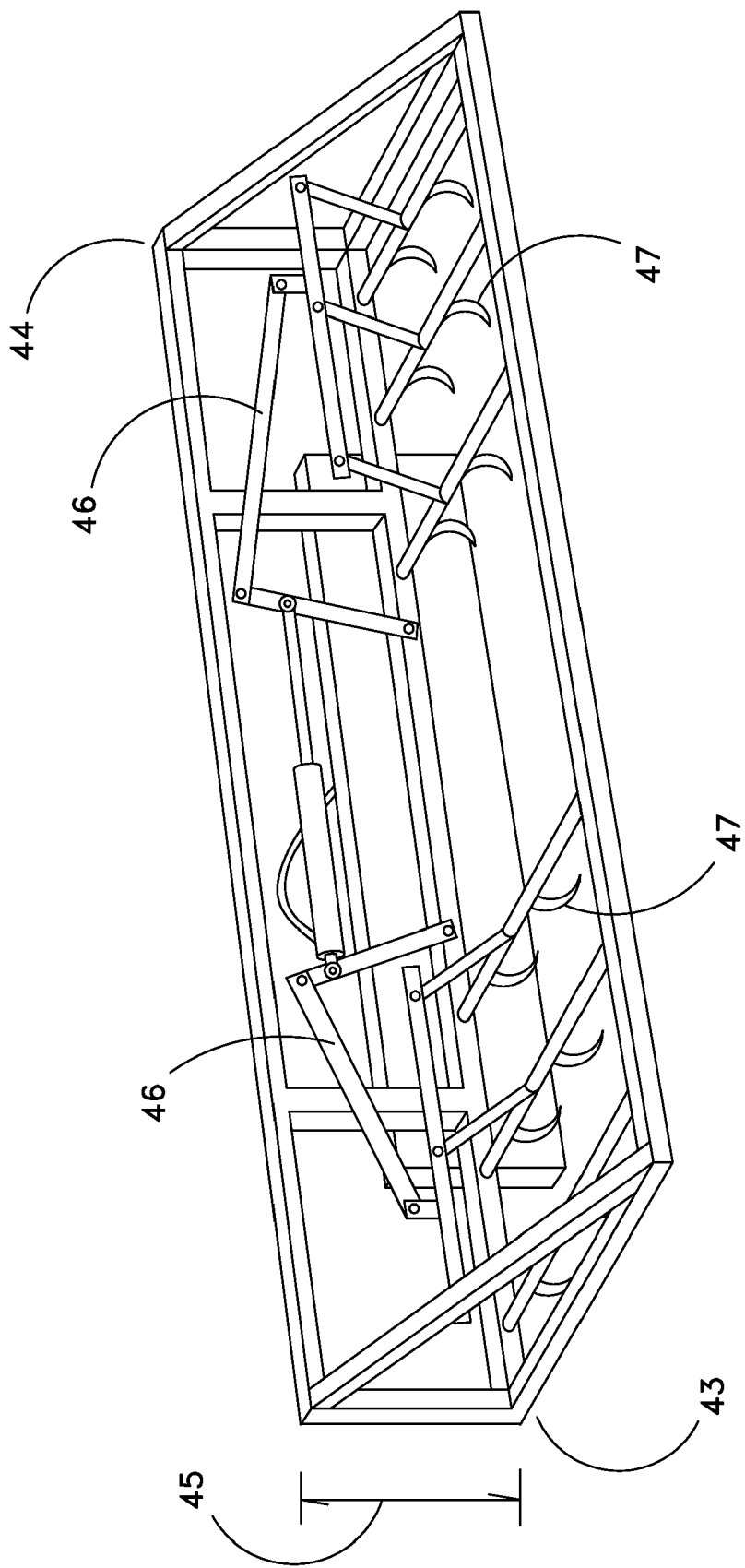
FIG. 14 is a perspective view of a low-profile bale handling apparatus in one embodiment.

Now referring primarily to FIG. 14, a bale handling apparatus in various embodiments may include a lower clearance dimension (43), an upper clearance dimension (44), and a vertical low profile separation distance (45) separating the lower clearance dimension (43) from the upper clearance dimension (44). The terms lower clearance dimension (43) and upper clearance dimension (44) may be understood to define the vertical dimensions through which the bale handling apparatus may pass without obstruction. The term profile may be understood to include generally the vertical clearances of the bale handling apparatus. The term low profile should be understood to include the vertical dimensions defined by the lower clearance dimension (43) and the upper clearance dimension (44) so as to promote maneuverability of the bale handling apparatus and operator visibility when operating the bale handling apparatus, perhaps so as to provide a lower profile as compared to relatively higher profile bale handling devices. Accordingly, a vertical low profile separation distance (45) may be understood to include the distance separating the lower clearance dimension (43) from the upper clearance dimension (44) such that the resulting vertical clearance of the bale handling apparatus may be considered low profile.

In various embodiments, a vertical low profile separation distance (45) may be a distance of less than 42 inches, less than 36 inches, less than 30 inches, less than 24 inches, less than 18 inches, less than 12 inches, or perhaps even less than 6 inches. Some embodiments may include a vertical low profile separation distance (45) of less than or equal to about 31 inches.

Embodiments also may include at least one upright bale engagement actuator (46) situated within said vertical low profile separation distance (45) and at least one bale engagement member (47) joined to the upright bale engagement actuator (46). A bale engagement member (47) may be understood to include any member capable of engaging a bale (3), for example so as to grip the bale (3) for movement. In various embodiments, a bale engagement member (47) may include a hook, a tooth, a tine, or the like, or perhaps even any suitable bale piercing member, which should be understood to include any member capable of engaging a bale (3) by piercing the bale (3).

The term upright bale engagement actuator (46) should be understood to include any element capable of actuating motion in a bale engagement member (47) so as to permit the bale engagement member (47) to engage a bale (3). For example, embodiments may include a rotating bale engagement member (47), wherein an upright bale engagement actuator (46) may cause the bale engagement member (47) to rotate. The term upright should be understood to include being situated in an upright orientation within the bale handling apparatus, perhaps even so that the upright bale engagement actuator (46) is capable of moving in a vertical direction. Such an upright orientation may provide a high degree of leverage to the bale engagement actuator, perhaps including where a bale engagement member (47) is similarly oriented in an upright orientation. For example, in some embodiments an upright bale engagement actuator (46) may be an extension arm configured to extend and retract in a vertical direction. The term vertical should be understood to include not only purely vertical motion, but also any motion having a substantial vertical component, for example such as extension through various angles less than 90 degrees but more than 0 degrees. Moreover, an upright bale engagement actuator (46) may be dimensioned to fit and situated within a vertical low profile separation distance (45). For example, an upright bale engagement actuator (46) in some embodiments may have a vertical clearance of less than or equal to about 16 inches.

Accordingly, embodiments may include separating a lower clearance dimension (43) and an upper clearance dimension (44) by a vertical low profile separation distance (45), dimensioning at least one upright bale engagement actuator (46) to fit within the vertical low profile separation distance (45), actuating the upright bale engagement actuator (46) within the vertical low profile separation distance (45), and contacting at least one bale (3) with at least one bale engagement member (47) responsively joined to the upright bale engagement actuator (46). Moreover, in some embodiments, actuating may include extending an extension arm.

A bale handling apparatus in various embodiments may include a universal mount (48). Such a universal mount (48) may be suitable for mounting the bale handling apparatus to a mobile machine, such as a tractor, loader, or truck. In this manner, it may be seen that a bale handling apparatus may be used to engage one or more bales (3), perhaps even bales that have been accumulated by a bale accumulation apparatus, and perhaps to move, stack, or otherwise manipulate the bales (3). Accordingly, embodiments may include accomplishing bale handling in universally mounted relation to a mobile machine.

Figure 15:
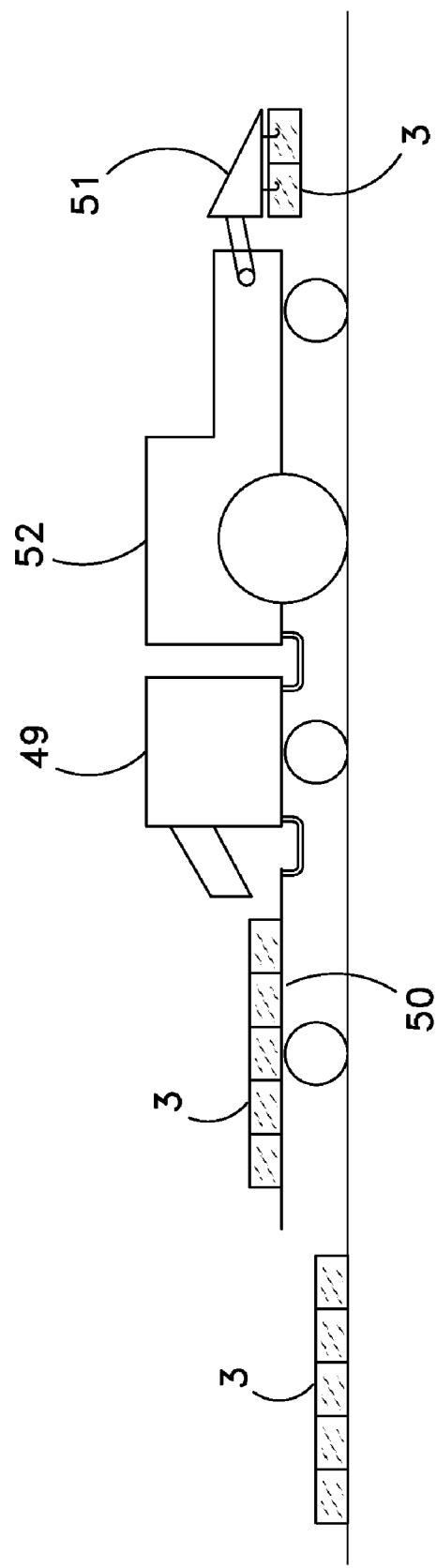
FIG. 15 is a schematic representation of a bale manipulation system in one embodiment.

Now referring primarily to FIG. 15, embodiments may include a bale manipulation system. The bale manipulation system in various embodiments may include a baler (49), a sliding undercarriage bale accumulation apparatus (50) coordinated to manipulate output from the baler, a high leverage low profile bale handling apparatus (51) coordinated to manipulate output from the bale accumulation apparatus, and at least one system-wide power source (52). Any suitable baler (49) as may be known may be employed by the bale manipulation system, as well as any suitable bale accumulation apparatus and bale handling apparatus consistent with the principles described herein. The term manipulate may be understood to include any operation performed on at least one bale (3) consistent with the principles described herein, and the term coordinated may be understood to include the actions of any of at least two elements as described herein working together to manipulate a bale (3). A system-wide power source (52) should be understood to include any single or multiple power sources capable of powering any element of the bale manipulation system, including but not restricted to perhaps all elements of the bale manipulation system, perhaps in a serial manner or perhaps even in a simultaneous manner. It also is noted that the system-wide power source (52) need not be a self-contained power source (41).

Accordingly, embodiments may include forming a bale (3) at a baler (49), outputting the bale (3) from the baler (49) to a bale accumulation apparatus (50), manipulating the bale (3) with the bale accumulation apparatus (50) using a sliding undercarriage, outputting the bale (3) from the bale accumulation apparatus (50) to a bale handling apparatus (51), manipulating the bale (3) with the bale handling apparatus (51) using a high leverage low profile environment, and powering each action with at least one system-wide power source (52).

Figure 16:
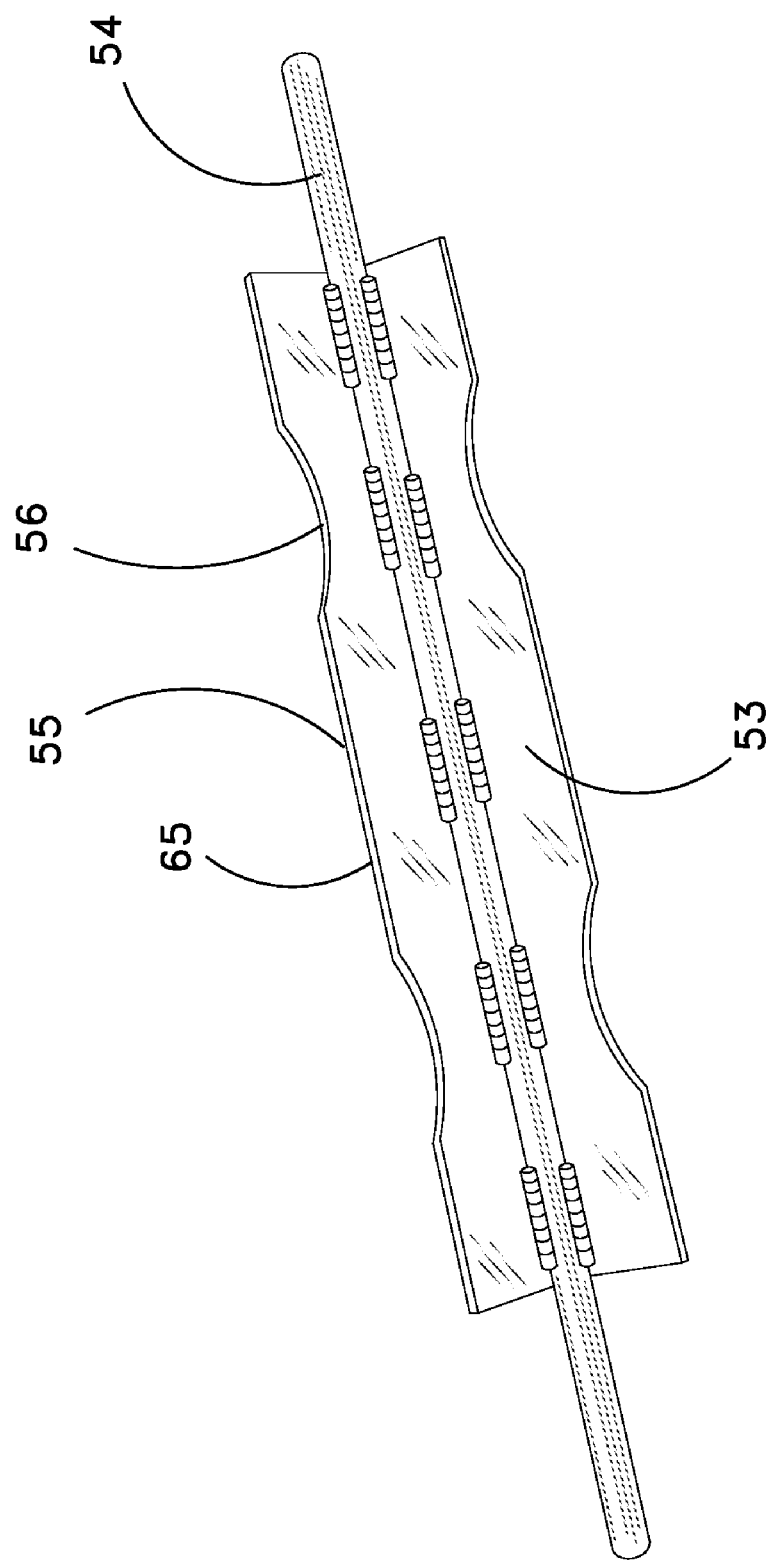
FIG. 16 is a perspective view of an axially rotational shaft having at least one bale movement blade joined thereto in one embodiment.

Now referring primarily to FIG. 16, embodiments may include at least one bale movement blade (53) joined to an axially rotational shaft (54). Such an axially rotational shaft (54) of course may include any suitably elongated member, such as round, square, or other shaped rods, bars, axles, or the like, that is capable of rotation about its own lengthwise axis. In various embodiments, an axially rotational shaft may be freely movable or may be driven, perhaps in the manner as discussed with respect to other kinds of movable parts described herein. In various embodiments, an axially rotational shaft (54) with at least one bale movement blade (53) may be a movement facilitation element, for example such as on a bale accumulation surface (1), and perhaps as described elsewhere herein.

Moreover, a bale movement blade (53) of course may include any suitably flattened surface having an edge (65) capable of catching on a bale and moving the bale when the blade is moved. In some embodiments, for example, a bale movement blade (53) joined to an axially rotational shaft (54) may serve to move a bale by catching on a surface of a bale, then moving the bale as the axially rotational shaft (54) is rotated about its lengthwise axis. In addition, embodiments of course may involve joining more than one bale movement blade (53) to an axially rotational shaft (54), for example so that a shaft may have two blades, three blades, four blades, or as many blades as may be desired. Further, bale movement of course may be accomplished through the use of more than one such axially rotational shaft (54), perhaps involving placement of multiple shafts in any configuration desired to move bales through various kinds of paths.

It may be appreciated that a bale movement blade (53) may be configured to engage a bale in a variety of manners. For example, it may be desirable to configure a bale movement blade (53) to engage only portions of a bale that are free of the bale's string. Engaging in this manner may prevent damage to the bale's string from the bale movement blade (53), for example perhaps as where the blade may tend to cut the string. Accordingly, a bale movement blade (53) in embodiments may include at least one non-string bale engagement portion (55) of the blade and at least one bale string contact avoidance portion (56) of the blade. Regarding a non-string bale engagement portion (55) of a blade, it may be appreciated that such a portion may be configured in any suitable manner to promote engagement with a bale. In some embodiments, for example, such a portion may be merely the edge (65) of the blade. Embodiments may include other suitable configurations, however, such as teeth, grips, nonskid surfaces, or the like, as may be suitable for engaging a bale.

With reference to a bale string contact avoidance portion (56), it may be similarly appreciated that such a portion may be configured in any suitable manner to promote avoidance of contact with the string by the blade. For example, embodiments may include a notch established on the blade providing a space for the string while the remainder of the blade engages the bale. The location of the notch on the blade may be accordingly coordinated to the placement of a string on the bale. Moreover, embodiments may involve establishing multiple bale string coordinated notches (57) coordinated to multiple string locations of a bale, or perhaps even multiple string locations of multiple bales.

Accordingly, embodiments may include engaging a non-string portion of a bale to a bale movement blade (53), avoiding contact of a bale string of the bale with the bale movement blade (53) while the non-string portion of the bale is so engaged, rotating an axially rotational shaft (54) to which the bale movement blade (53) is joined, moving the bale as a result of rotating the axially rotational shaft (54), and avoiding contact of the bale string with the bale movement blade (53) when moving the bale. Of course, engaging a non-string portion of a bale to a bale movement blade (53) may be accomplished in some embodiments by using an edge (65) of a bale movement blade (53). Moreover, engaging a non-string portion of a bale to a bale movement blade (53) of course may involve engaging one or more non-string portions of one or more bales to multiple bale movement blades (53).

Figure 17:
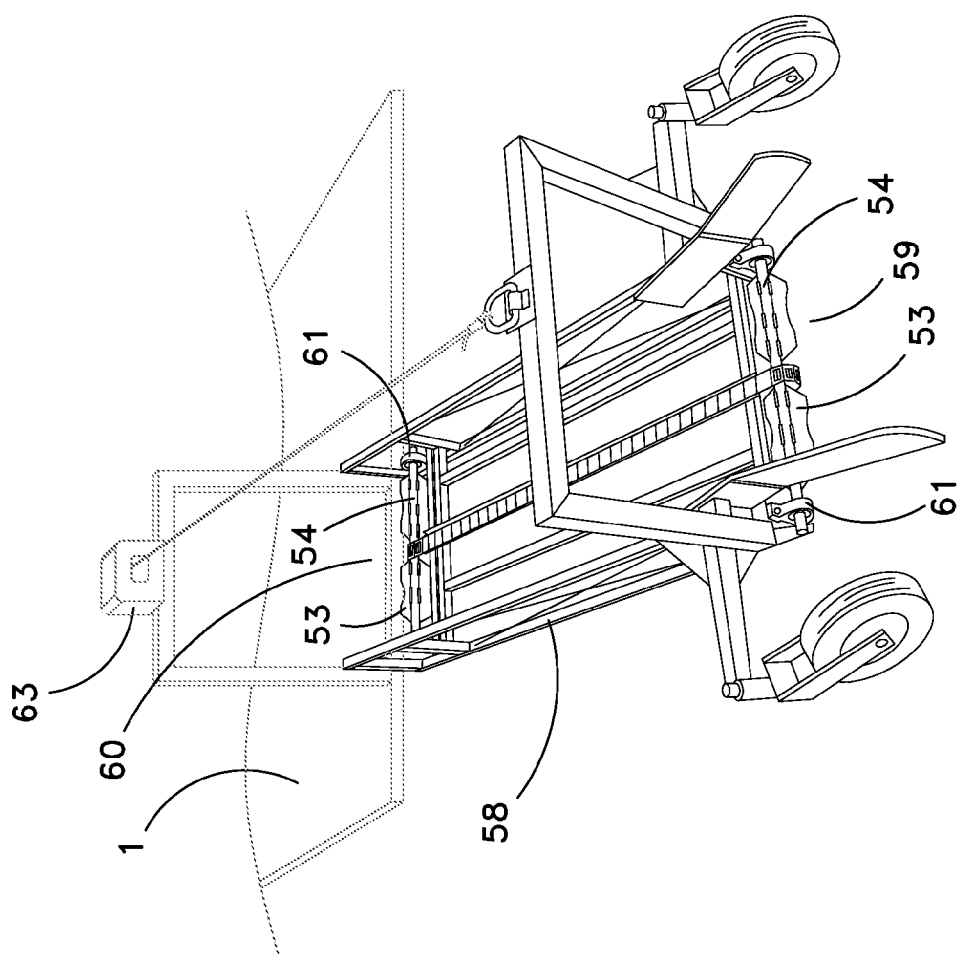
FIG. 17 is a perspective view of a bale movement chute in one embodiment.

Now referring primarily to FIG. 17, embodiments may include a bale movement chute (58). Such a chute may provide an inclined path through which a bale may be moved from one location to another location, and of course may be understood to permit any configuration suitable to accomplish this goal. A chute in various embodiments may include a bale input end (59) and a bale output end (60), for example perhaps as where a bale input end (59) may be located at a ground location and a bale output end (60) may be elevated with respect to the ground location. In one configuration, for example, a bale input end (59) may be configured to receive at least one bale from the ground location, in any suitable orientation such as flat or on end, and move the bale through the chute so that the bale may be output at the elevated location, for example perhaps as where the bale output end (59) may be configured to eject the bale onto a bale accumulation surface (1).

Of course, embodiments may involve any of various suitable techniques to move a bale through a bale movement chute (58). Such movement in some embodiments, for example, may involve using one or more axially rotational shafts (54) to which one or more bale movement blades (53) may be joined, perhaps as described elsewhere herein. Moreover, such a shaft may be joined to such a chute at a bale engagement location (61), and a bale movement chute (58) of course may have more than one bale engagement location (61) to permit the use of multiple shafts in the chute. Accordingly, embodiments may include establishing multiple axially rotational shafts (54) at multiple bale engagement locations (61) of a bale movement chute (58). Embodiments of course also may include using moving parts to move a bale through a bale movement chute (58), perhaps including bale catches (72), as discussed elsewhere herein.

Moreover, embodiments may include a bale movement chute retraction element (63), perhaps to allow adjustment of the incline of the chute. In some embodiments, such a retraction element may be a powered retraction element, for example such as a winch or other suitable device. In this manner, embodiments may involve power retracting the chute from the ground location into a retracted position, for example perhaps as wherein the chute may be attached to a bale accumulator, and may need to be retracted from a ground orientation when not in use to receive bales from a ground location.

Figure 21:
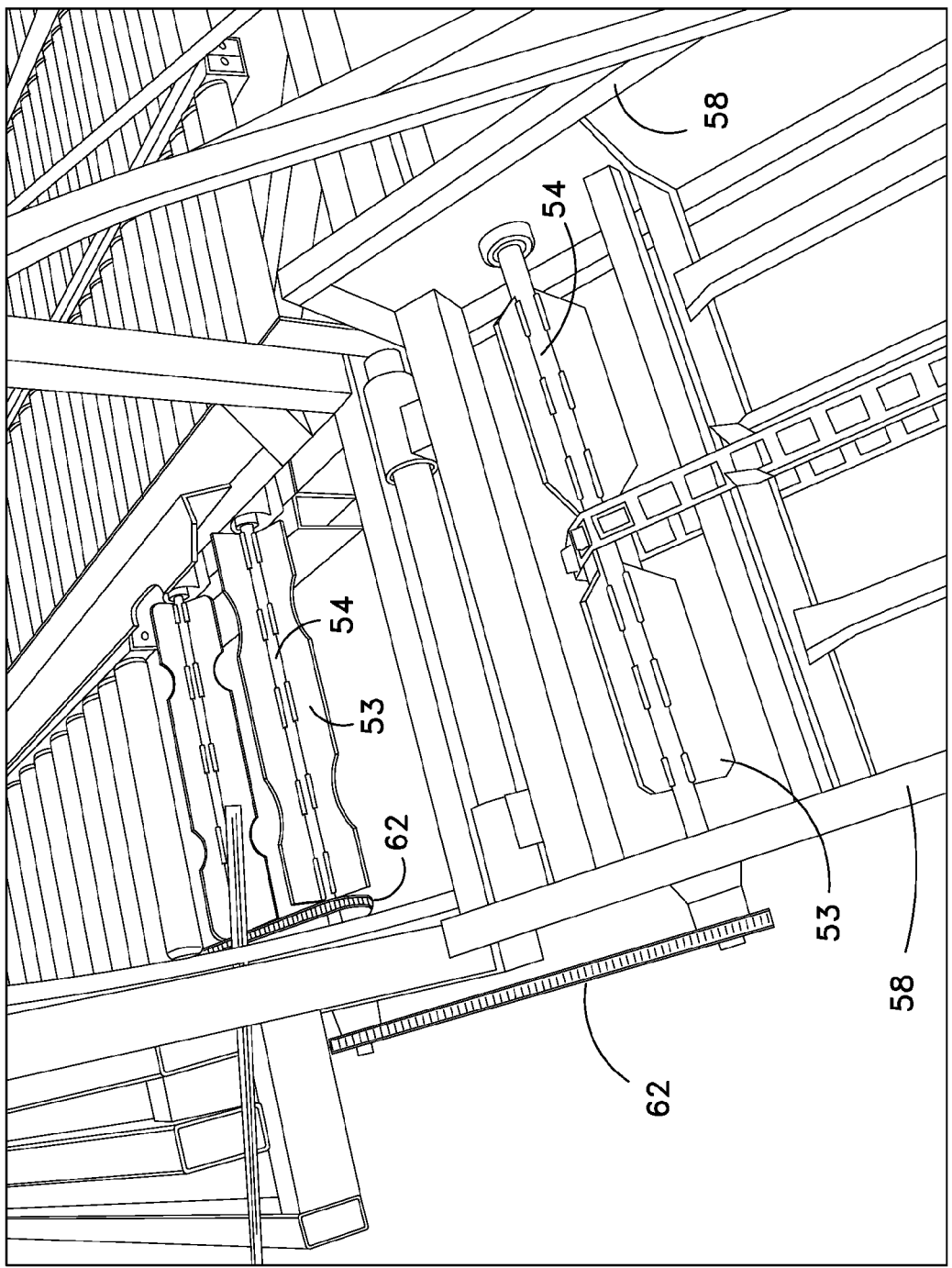
FIG. 21 is a perspective view of a motion coordination element in one embodiment.

Embodiments also may include a motion coordination element (62) that permits the rotational motion of an axially rotational shaft (54) to be coordinated to other moving parts, perhaps such as a movement facilitation element or a baler output assistance element as each may be described elsewhere herein. In this manner, the movement of bales through a bale movement chute (58) may be coordinated to achieve perhaps smooth and uniform motion as bales may transit the chute and be output from the chute to another bale movement device. For example, where bales are ejected from the chute to a bale accumulation surface (1), the motion of one or more axially rotational shafts (54) in the chute may be coordinated to the motion of one or more baler output assistance elements on the bale accumulation surface (1) to ensure smooth and uninterrupted passage, as perhaps by connecting the shafts and the assistance elements with a chain drive to ensure that each spins at a rate regulated by the chain drive, for example as may be shown in FIG. 21. Of course, it will be appreciated that this is just one example of a motion coordination element (62), and that a motion coordination element may take any suitable configuration to coordinate a motion of an axially rotational shaft (54) to any other appropriate moving part.

Accordingly, embodiments may include establishing at least one axially rotational shaft (54) at least one bale engagement location (61) of a bale movement chute (58), positioning a bale input end (59) of the chute substantially at a ground location, receiving a bale from the ground location into the bale input end (59), moving the bale through at least a portion of the chute by rotating the axially rotational shaft (54) to which a bale movement blade (53) is joined, and ejecting the bale from the chute substantially at an elevated location with respect to said the ground location.

Now referring primarily to FIGS. 1-4, embodiments may include a vertical displacement (64) separating a bale accumulation surface (1) from a bale reception surface (11). Examples may include a step, a lip, a drop, or the like. Moreover, such a vertical displacement in embodiments may be configured to run along some or perhaps even all of the contiguous boundary at which the bale accumulation surface (1) and the bale reception surface (11) may be proximately located. The vertical displacement (64) may provide a vertical distance through which a bale or bale row transferred by a bale transfer element (40) may be moved when transferred from the bale accumulation surface (1) to the bale reception surface (11), and may serve to establish a bale alignment boundary (15) for such a bale or bale row received on the bale reception surface (11). Any suitable height may be employed, of course, which in various embodiments may include perhaps less than 5 inches, less than 4 inches, less than 3 inches, less than 2 inches, or perhaps even less than 1 inch. Accordingly, embodiments may include vertically displacing a bale reception surface (11) from a bale accumulation surface (1), including perhaps to a suitable height as just described.

Figure 19:
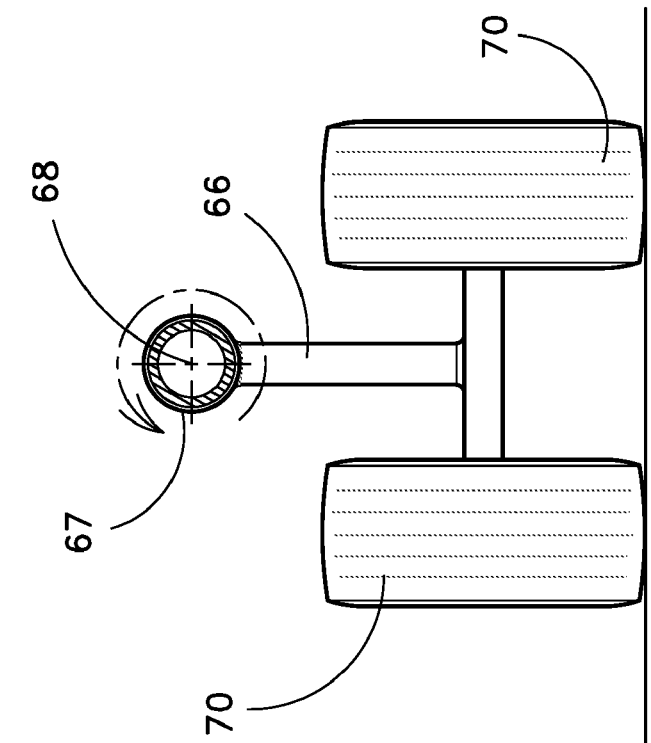
FIG. 19 is a plan view of a wheel assembly in one embodiment.
Figure 18:
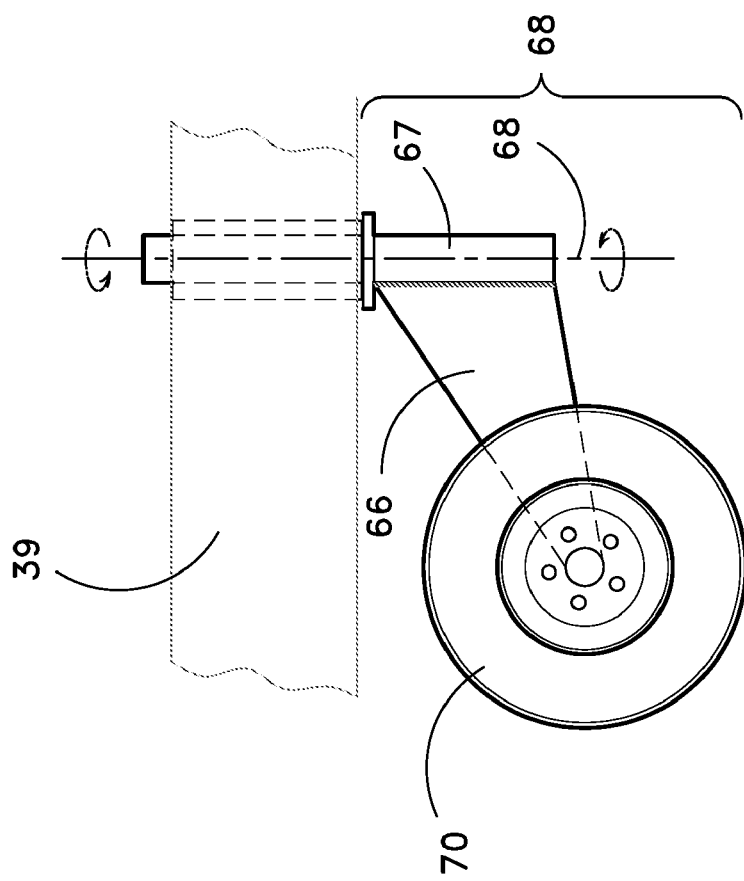
FIG. 18 is an elevation view of a wheel assembly in one embodiment.

Now referring primarily to FIGS. 18-19, embodiments may include a support structure (39) and at least one wheel (70). Such a wheel may be joined to the support structure (39) with a wheel displacement member (66) and an axially rotational wheel support member (67). Such an axially rotational wheel support member (67) may be joined to the support structure (39) and may have a substantially vertical axis of rotation (68), for example so as to permit the member to rotate about an axis that is substantially vertical with respect to the ground surface over which the wheel (70) may move. A wheel displacement support member (66) simply may provide support for the wheel (70) that is displaced from the vertical axis of rotation (68). In this manner, the support structure (39) may be capable of being moved over a ground surface, in as much as the wheel (70) may be connected to an axially rotational wheel support member (67) by a wheel displacement support member (66), the assembly perhaps being joined to the support structure (39). Accordingly, embodiments may include establishing at least one wheel (70), supporting the wheel (70) displaced from an axially rotational wheel support member (67) with a wheel displacement support member (66), rotating the wheel (70) about a substantially vertical axis of rotation (68) of the axially rotational wheel support member (67), and joining the axially rotational wheel support member (67) to a support structure (39). Moreover, embodiments may include establishing a wheel support height (69), which may simply be the overall height of the wheel and the elements required to support it and join it to a support structure (39). For example, embodiments may include establishing a wheel support height (69) of between perhaps about 3 inches and 30 inches.

Several advantages may attend the inventive technology. The methods and apparatus described herein perhaps may permit improved efficiencies in moving bales over various bale support surfaces. In particular, the total path distance through which a bale may be moved perhaps may be minimized, in as much as bales may be subjected to the perhaps minimal steps of receiving bales on a bale accumulation surface (1), transferring bales transversely across said bale accumulation surface (1) to a bale reception surface (11), and tilting said bale reception surface (11) to deposit bales on the ground. More specifically, such movements may eliminate perhaps superfluous movements such as flipping, rotating, stacking, lifting, or dropping individual bales, and may eliminate performing such steps on multiple platforms or multiple levels, the foregoing of which may be commonplace in conventional bale accumulation processes to at least some degree. In addition, the application of motive forces may be efficiently maximized, for example perhaps by eliminating the need to harness such motive forces to accomplish the possibly superfluous movements described, and perhaps by directing such motive forces in efficient configurations, such as linear path specific configurations and tilt specific configurations. Moreover, such perhaps minimal number of steps may represent simplified bale accumulation methods and apparatus compared to conventional bale accumulation methods and apparatus, perhaps increasing reliability in bale accumulation by presenting fewer opportunities for errors in the bale accumulation process. Further, the use of bale override alignment elements may permit the alignment of bales on bale support surfaces without substantially restricting the paths by which such bales may be moved through thereon, again perhaps promoting the efficient movement of bales on bale support surfaces. As a result, the minimal number of steps, reduced total path distance, and bale override alignment techniques of the present inventive technology may contribute to a more rapid bale accumulation process as compared to conventional techniques, perhaps helping to permit the present bale accumulation methods and apparatus to keep up with the output of modern automated balers.

As may be easily understood from the foregoing, the basic concepts of the present inventive technology may be embodied in a variety of ways. It involves both bale accumulation techniques as well as devices to accomplish the appropriate bale accumulation. In this application, the bale accumulation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention.

Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "transfer element" should be understood to encompass disclosure of the act of "transferring"—whether explicitly discussed or not—and, conversely, were there effectively disclosure of the act of "transferring", such a disclosure should be understood to encompass disclosure of a "transfer element" and even a "means for transferring" Such changes and alternative terms are to be understood to be explicitly included in the description.

Any patents, publications, or other references mentioned in this application for patent are hereby incorporated by reference. Any priority cases claimed by this application are hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the Information Disclosure Statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the bale accumulation devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A bale positioning apparatus comprising:

a bale accumulation surface;

a bale push bar disposed above said bale accumulation surface;

a linear path specific opening transversely disposed through said bale accumulation surface;

a columnar rigid member situated through said linear path specific opening and joined to said bale push bar;

a rigid structural carriage element disposed beneath said bale accumulation surface and joined to said columnar rigid member;

a linear path specific hydraulic cyclical motive force application element disposed below said bale accumulation surface and joined to said rigid structural carriage element;

at least two parallel rails transversely disposed below said bale accumulation surface;

at least two bearings joined to said rigid structural carriage element and situated within a groove disposed on each of said at least two parallel rails transversely disposed below said bale accumulation surface;

at least one bale alignment zone of said bale accumulation surface, wherein said bale alignment zone comprises a multiple in-line bale alignment zone;

at least one bale alignment boundary of said bale alignment zone, wherein said bale alignment boundary comprises a bale dimension coordinated boundary length, and wherein said bale dimension coordinated boundary length comprises at least one lateral edge of multiple in-line bales, and wherein said at least one lateral edge comprises a multiple in-line bale row interlineated lateral edge;

a support surface fixed and emplaced bale override alignment element situated at said at least one bale alignment boundary in between multiple rows of bales and which allows bales to override said alignment element when being pushed over said alignment element and thereafter helping to maintain said bales in alignment; and a bale override interface provided on said support surface emplaced bale override alignment element.

2. A bale positioning apparatus as described in claim 1, further comprising a spring element joined to said rigid structural carriage element and to a stable anchor element.

3. A bale positioning apparatus as described in claim 1, further comprising a total cycle time of said linear path specific hydraulic cyclical motive force application element selected from the group consisting of less than about 6 seconds, less than about 5 seconds, less than about 4 seconds, less than about 3 seconds, less than about 2 seconds, less than about 1 seconds, and less that about 0.5 seconds.

4. A bale positioning apparatus as described in claim 1, wherein said bale override alignment element comprises an angle iron.

5. A bale positioning apparatus as described in claim 4, wherein said bale override interface comprises an angle of said angle iron.

6. A bale positioning apparatus as described in claim 1, further comprising a bale reception surface substantially contiguously disposed with respect to said bale accumulation surface, and wherein said bale reception surface is configured to receive said at least one bale unidirectionally transversely transferred across said bale accumulation surface in a neutral orientation.

7. A bale positioning apparatus as described in claim 6, further comprising:
a hinge joined to said bale reception surface; and
a tilt specific hydraulic cyclical motive force application element joined to said bale reception surface.

8. A bale positioning apparatus as described in claim 6, further comprising:
a bale movement activated pivot arm disposed above said bale accumulation surface;
a linkage element disposed below said bale accumulation surface joined to said pivot arm; and
a hydraulic linear path specific cyclical motive force application element actuator disposed below said bale accumulation surface joined to said hydraulic linear path specific cyclical motive force application element.

9. A bale positioning apparatus as described in claim 6, further comprising:
a bale movement activated push-over plate disposed above said bale reception surface;
a linkage element disposed below said bale reception surface joined to said push-over plate; and
a hydraulic tilt specific cyclical motive force application element actuator disposed below said bale reception surface joined to said hydraulic tilt specific cyclical motive force application element.

10. A method for positioning bales comprising the steps of:
depositing multiple in-line bales on a bale accumulation surface;
positioning at least one bale deposited on said bale accumulation surface within a bale alignment zone of said bale accumulation surface, wherein said step of positioning said at least one bale comprises the step of positioning said multiple in-line bales;

establishing a bale alignment boundary of said bale alignment zone, wherein said step of establishing a bale alignment boundary comprises the step of establishing a bale dimension coordinated boundary length, and wherein said step of establishing a bale dimension coordinated boundary length comprises the step of coordinating said length to at least one lateral edge of multiple in-line bales, and wherein said step of coordinating said length comprises the step of coordinating said length to a multiple in-line bale row interlineated lateral edge;

emplacing a fixed bale override alignment element at said bale alignment boundary of said bale alignment zone in between multiple rows of bales and which allows bales to override said alignment element when being pushed over said alignment element and thereafter helping to maintain said bales in alignment;

providing a bale override interface of said bale override alignment element;

hydraulically applying a cyclical linear path specific motive force beneath said bale accumulation surface;

moving a rigid structural carriage element disposed beneath said bale accumulation surface as a result of said step of hydraulically applying a cyclical linear path specific motive force beneath said bale accumulation surface;

joining at least two bearings to said rigid structural carriage element;

situating each of said at least two bearings within a groove disposed on at least two parallel rails transversely disposed beneath said bale accumulation surface;

using said at least two parallel rails to confine a motion of said rigid structural carriage element to a specific linear path transversely disposed beneath said bale accumulation surface;

moving a rigid columnar member joined to said rigid structural carriage element through a linear path specific opening transversely disposed through said bale accumulation surface;

moving a bale push bar disposed above said bale accumulation surface and joined to said rigid columnar member in a transverse specific linear path with respect to said bale accumulation surface;

unidirectionally moving said multiple in-line bales in a neutral orientation in a transverse specific linear path across said bale accumulation surface using said bale push bar;

incurring contact between said multiple in-line bales and said bale override alignment interface;

aligning said multiple in-line bales as a result of said step of incurring contact between said bale and said bale override alignment interface.

11. A method for positioning bales as described in claim 10, further comprising the step of elastically retrieving said rigid structural carriage element.

12. A method for positioning bales as described in claim 11, wherein said step of elastically retrieving said rigid structural carriage element comprises the step of elastically retrieving said rigid structural carriage element with a spring element.

13. A method for positioning bales as described in claim 10, further comprising the step of accomplishing a total cycle time selected from the group consisting of less than about 6 seconds, less than about 5 seconds, less than about 4 seconds, less than about 3 seconds, less than about 2 seconds, less than about 1 seconds, and less that about 0.5 seconds.

14. A method for positioning bales as described in claim 10, wherein said step of providing a bale override interface comprises the step of providing an angle of an angle iron.

15. A method for positioning bales as described in claim 10, further comprising the step of substantially contiguously disposing a bale reception surface proximate to said bale accumulation surface.

16. A method for positioning bales as described in claim 15, further comprising the steps of:
   hydraulically applying a cyclical tilt specific motive force to said bale reception surface;
   tilting said bale reception surface about a hinge element.

17. A method for positioning bales as described in claim 15, further comprising the steps of:
   displacing a pivot arm disposed above said bale accumulation surface with said bale;
   affecting a linkage element disposed below said bale accumulation surface as a result of said step of displacing said pivot arm; and
   actuating a hydraulic linear path specific cyclical motive force application element actuator disposed below said bale accumulation surface as a result of said step of affecting said linkage element.

18. A method for positioning bales as described in claim 15, further comprising the steps of:
   displacing a push-over plate disposed above said bale reception surface with said bale;
   affecting a linkage element disposed below said bale reception surface as a result of said step of displacing said push-over plate; and
   actuating a hydraulic tilt specific motive force application element actuator disposed below said bale reception surface as a result of said step of affecting said linkage element.

* * * * *